United States Patent [19]
Hluchyj et al.

[11] Patent Number: 5,426,640
[45] Date of Patent: Jun. 20, 1995

[54] RATE-BASED ADAPTIVE CONGESTION CONTROL SYSTEM AND METHOD FOR INTEGRATED PACKET NETWORKS

[75] Inventors: Michael G. Hluchyj, Wellesley; Nanying Yin, Newton Centre; Daniel B. Grossman, Norwood, all of Mass.

[73] Assignee: Codex Corporation, Mansfield, Mass.

[21] Appl. No.: 823,724

[22] Filed: Jan. 21, 1992

[51] Int. Cl.$^6$ .................................. H04L 12/02
[52] U.S. Cl. ............................. 370/94.1; 370/60
[58] Field of Search .................. 370/94.1, 60, 94.2, 370/79, 60.1, 13, 17, 94.3, 58.1–58.3; 340/825.02, 825.06

[56] References Cited

U.S. PATENT DOCUMENTS

| | | | |
|---|---|---|---|
| 4,769,810 | 9/1988 | Eckberg, Jr. et al. | 370/60 |
| 4,769,811 | 9/1988 | Eckberg, Jr. et al. | 370/60 |
| 4,825,208 | 4/1989 | Mueller et al. | 340/825.02 |
| 4,849,968 | 7/1989 | Turner | 370/94.1 |
| 4,942,569 | 7/1990 | Mueno | 370/60 |
| 4,984,264 | 1/1991 | Katsube | 370/60 |
| 5,058,111 | 10/1991 | Kihara et al. | 370/60 |
| 5,119,364 | 6/1992 | Thiebaut et al. | 370/94.1 |
| 5,119,372 | 6/1992 | Verbeek | 370/60 |
| 5,179,556 | 1/1993 | Turner | 370/94.1 |
| 5,179,557 | 1/1993 | Kudo | 370/60 |

OTHER PUBLICATIONS

"Integrated Services Digital Network (ISDN)—Architectural Framework and Service Description for Frame-Relaying Bearer Service–Addendum #1.", American National Standard for Telecommunications, ANSI-T1S1/90–175R5, T1S1.2/91–454 pp. 1–8, 10–12.

"A Binary Feedback Scheme for Congestion Avoidance in Computer Networks with a Connectionless Network Layer", R. R. Ramakrishnan and Raj Jain, Computer Communications Review, vol. 18, No. 4, Aug. 1988 pp. 303–313.

"Paris: An Approach to Integrated High-Speed Private Networks", Israel Cidon and Inder S. Gopal, International Journal of Digital and Analog Cabled Systems, vol. 1, 77–85, 1988, Jun. 1990.

Primary Examiner—Douglas W. Olms
Assistant Examiner—Ajit Patel
Attorney, Agent, or Firm—Darleen J. Stockley

[57] ABSTRACT

An adaptive congestion control device (600) and method minimize congestion using independent congestion level indicators. The invention allows efficient recovery for an integrated packet network that becomes congested and allows a user to utilize the network on a space-available basis when capacity is available.

30 Claims, 10 Drawing Sheets

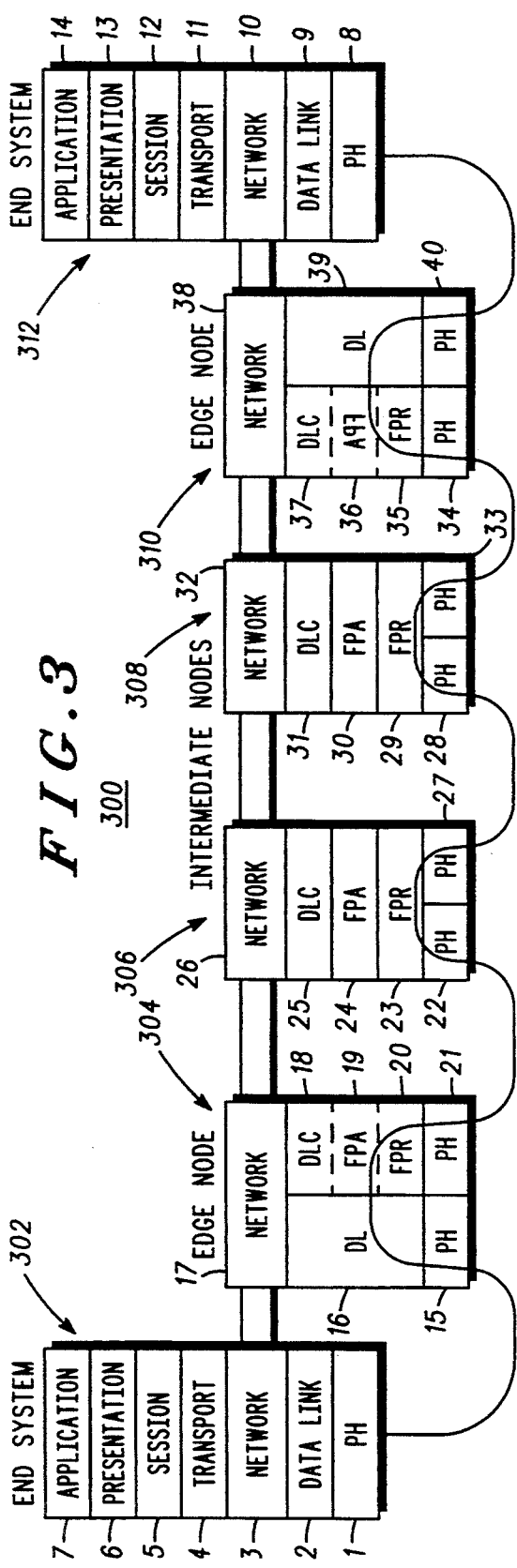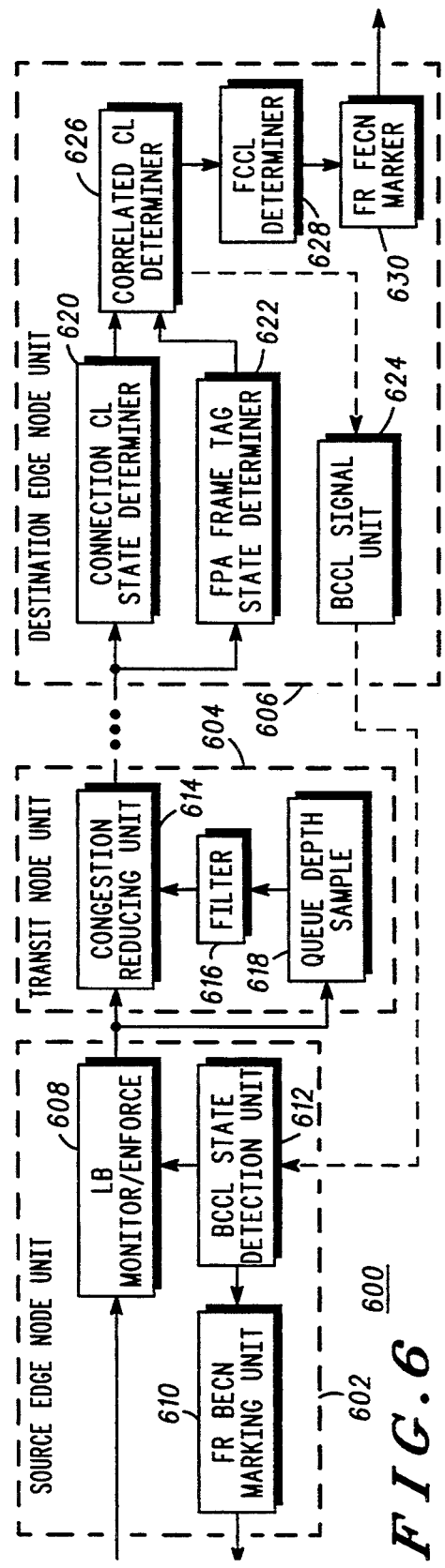

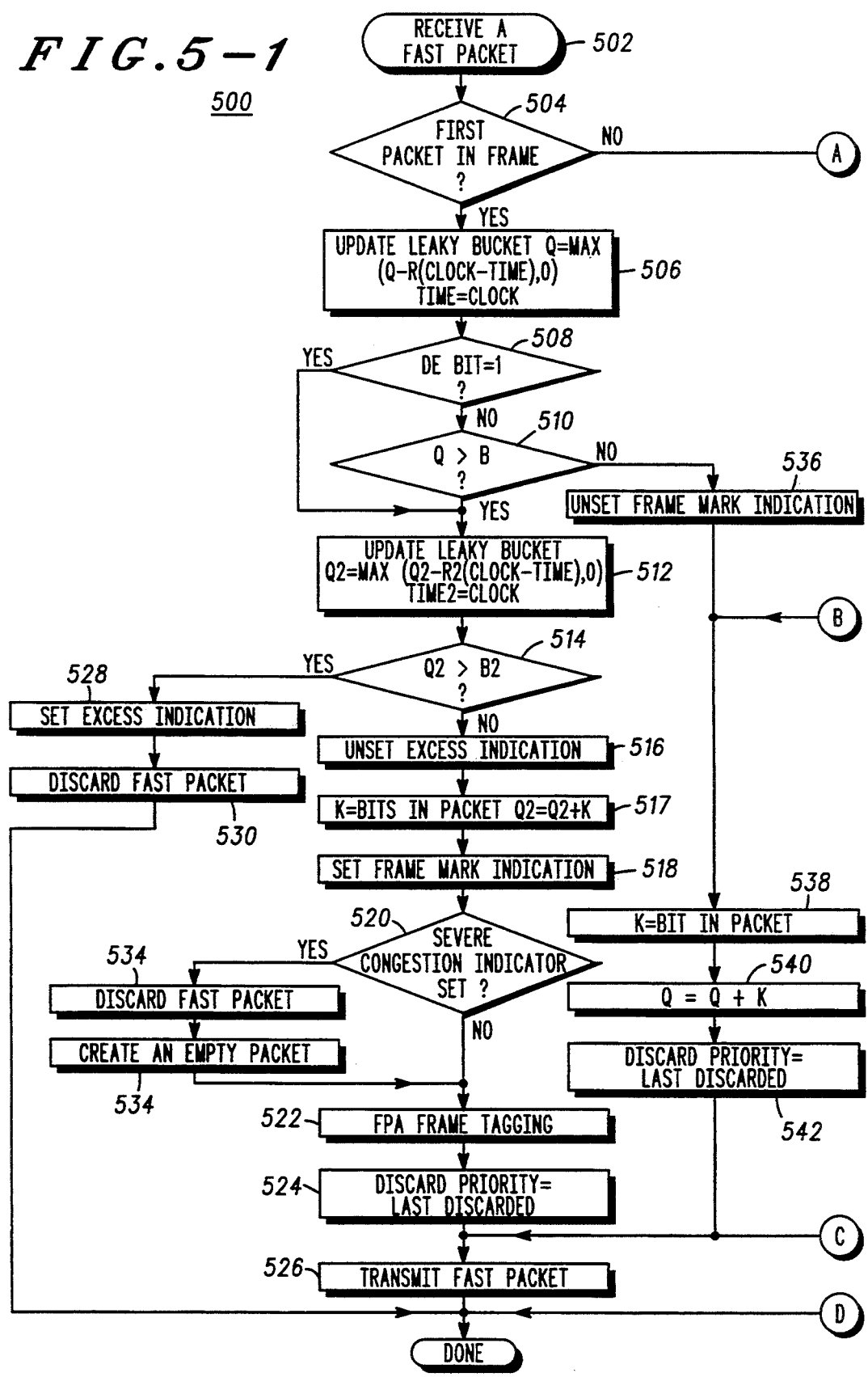

RATE-BASED ADAPTIVE CONGESTION CONTROL SYSTEM AND METHOD FOR INTEGRATED PACKET NETWORKS

FIELD OF THE INVENTION

This invention relates generally to data processing and data communications, and more particularly relates to controlling congestion in an integrated packet network.

BACKGROUND OF THE INVENTION

Businesses, institutions, government agencies, common carriers, and value-added service providers utilize packet-switched networks that integrate frame-delimited data traffic (including frame relay), packetized speech, and constant bit rate (non-delimited) traffic onto common transmission facilities. For such networks, a basic unit of transmission has been defined to be a "fast packet." A fast packet typically contains a header that includes connection identification and other overhead information, and is fixed or restricted in length (e.g., to contain a "payload" of 48 octets of user information). Where is it necessary to convey information of length greater than that of a maximum payload size, a fast packet adaption protocol is utilized, operating at a higher level than a fast packet relaying protocol, where the fast packet adaption protocol includes a segmentation and reassembly function. It is useful to note that transmission of integrated packets requires congestion control because of its bursty nature, while transmission of constant bit rate (CBR) traffic does not require such control.

Packet switched networks are subject to congestion when traffic offered to the network exceeds a capacity of the network. Such congestion is random in nature. End-user equipment tends to offer traffic in "bursts," interspersed with periods of inactivity. Networks are typically designed to accommodate some expected aggregate offered load. However, cost to an operator of the transmission network facilities and related equipment increases as the capacity of the network. Thus, networks are often designed to accommodate less than an absolute maximum possible offered load, and to rely on statistical effects to avoid blocking of transmission. Such a design may lead to congestion.

During occurrence of congestion, queues internal to nodes that constitute the network grow, and may exceed the memory allocated to them, forcing packets to be discarded. In addition, the end-to-end transit delay experienced by packets traversing the network increases significantly as offered traffic increases. Discarding of packets and increased end-to-end transit delay degrades an end-user's perceived quality of service. In addition, discard or excessive delay cause commonly used end-to-end protocols to retransmit not only those packets which were discarded or delayed, but all packets which were unacknowledged at a time that the discard or time-out was determined. This typically results in an avalanche effect, during which the network ceases to perform useful work and cannot recover without manual intervention.

In a "connection-oriented" packet network, values of quality-of-service parameters are negotiated among originating end-user equipment, the network(s), and terminating end-user equipment. Categories of negotiated parameters include throughput and transit delay. Throughput parameters typically describe the users' expectations of traffic to be offered during a given time period, an estimation of a greatest amount of traffic the users expect to offer during such a period, and a metric for describing "burstiness" of traffic. This throughput information is used by the network(s) for purposes such as resource allocation and rate enforcement.

There is a need for a device and method for providing a rate-based congestion control for integrated packet networks that performs rate enforcement such that end-user equipment may exceed an expected throughput agreed during negotiation, utilizing the network(s) on a space-available basis when capacity is available in the network(s).

SUMMARY OF THE INVENTION

A system and method are included for providing rate-based congestion control in an integrated fast packet network. Each packet is capable of conveying a plurality of levels of congestion indication. The system includes units for and the method includes steps for providing the functions of, a source edge node unit, operably coupled to receive the fast packet traffic for transmission over the network, said unit having a predetermined throughput rate, for rate-based monitoring and rate enforcement of the traffic utilizing a monitor/enforcer unit, a transit node unit, operably coupled to the source edge node unit, having a plurality of intermediate nodes for providing at said nodes fast packet transmission paths, and a destination edge node unit, operably coupled to the transit node unit, for providing at least a correlated congestion level and for outputting traffic at a realized throughput rate, such that the realized throughput rate of the transmitted fast packets may exceed the negotiated throughput rate where the fast packets utilize unallocated or unused network capacity.

The terms 'fast packet' and 'packet' are used interchangeably.

BRIEF DESCRIPTION OF THE DRAWINGS

FIGS. 3, numeral 300, illustrates a protocol profile of a network, modelled according to the Open System Interconnection (OSI) reference model, utilizing the method of the present invention.

FIG. 6, numeral 600, illustrates a first embodiment of a system that utilizes the present invention for providing rate-based congestion control in an integrated fast packet network, each fast packet capable of conveying a plurality of levels of congestion.

DETAILED DESCRIPTION OF A PREFERRED EMBODIMENT

The present invention provides several advantages over known approaches. First, at least four levels of network congestion are conveyed in a fast packet header in a forward direction (i.e., toward a destination user's equipment), providing corresponding levels of action by the network. Since other schemes have two levels or none, the present invention, by utilizing the four levels in a unique fashion, provides for a greater scope of action by the network.

Second, levels of congestion are tracked and filtered independently by intermediate switching nodes. An indication of a highest congestion level encountered between an entry and egress point is conveyed in each fast packet. This approach provides more efficient network operation for paths that cross multiple switching nodes. In addition, this avoids problems (such as are found utilizing density marking schemes) of distinguishing actual congestion from short-term, inconsequential changes in the states of individual switching nodes, when said changes are summed over all the nodes traversed by a path.

Third, when congestion occurs in one or more switching nodes, only those connections which exceed their negotiated throughput parameters receive an explicit congestion indication unless one or more switching node experiences severe congestion. Thus, during periods of mild or moderate congestion, connections operating within the throughput parameters previously negotiated between the end-user equipment and the network continue to receive the throughput so negotiated.

Fourth, stability of the network is independent of specific behavior of end-user equipment. Fifth, feedback of severe congestion information toward an entry to the network causes discarding of information, thus not relying, as does existing art, on discarding at a congested switching node. This frees processing capacity in congested nodes.

Figure 1:
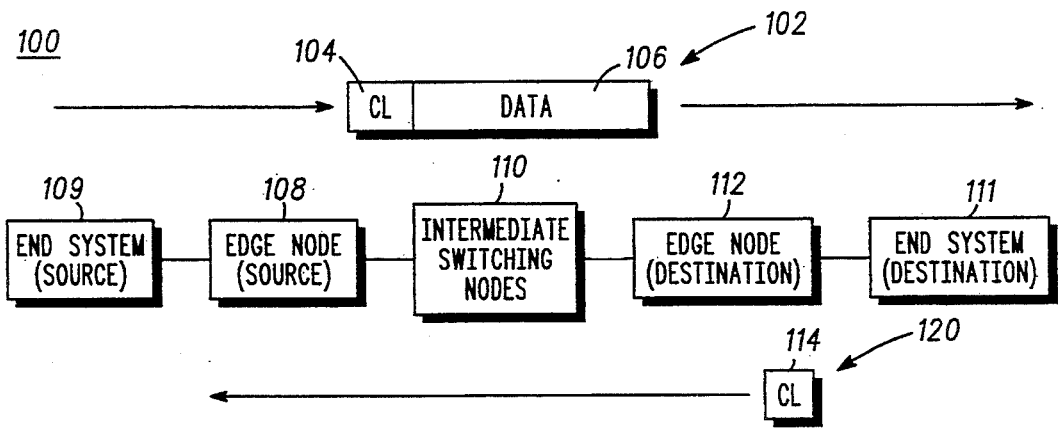
FIG. 1, numeral 100, illustrates relevant fields of an information packet (102), typically a fast packet, and information gathering of congestion information along a fast packet source-to-destination connection path of a subnetwork (SUBPATH) utilizing a fast packet with a multiple bit congestion level field in accordance with the present invention.

FIG. 1, numeral 100, illustrates relevant fields of an information packet (102), typically a fast packet, and information gathering of congestion information along a packet source-to-destination connection path of a subnetwork utilizing a fast packet with a multiple bit congestion level field in accordance with the present invention. The subnetwork typically includes INTERMEDIATE SWITCHING NODES (110), coupled, respectively, to a SOURCE EDGE NODE (108) and to a DESTINATION EDGE NODE (112), the subnetwork further being coupled to at least two end systems, at least one being the SOURCE END SYSTEM (109), and at least one being a DESTINATION END SYSTEM (111), to provide operable transmission of fast packets along the path between the SOURCE EDGE NODE (108) and the DESTINATION EDGE NODE (112), described more fully below (FIG. 6). The data packet includes at least a field CL (104) that represents a multiple bit field, typically two bits, used to store and indicate a congestion level of a most congested internodal link along the path and a data field (106). The congestion level of an internodal link is determined locally in each intermediate node feeding the link. In the preferred embodiment the two bit field of CL takes on values corresponding to normal, mild, moderate, and severe levels of congestion. At each intermediate node fast packets are queued into at least voice and data transit queues, and the congestion level is determined by comparing an average depth of transit queues within a queue group to a set of predetermined thresholds. Voice and data are in separate queue groups. The threshold values depend on both the queue group and a specific queue within the group (typically high, medium, and low priority queues for the data group). The congestion level is tracked separately for voice and data queue groups, with the congestion level of the data queue group set to that of the most congested priority queue. The DESTINATION EDGE NODE typically (e.g., periodically or after changes in the state of the path) copies the two bit field CL (114) into a second packet (120) containing no user data and only one of three field codes (normal, moderate, and severe) and utilizes a closed-loop feedback scheme to provide backward congestion rate adjustment information. Generally, normal and mild congestion level states are combined to form a Backward Correlated Congestion Level (BCCL) normal state, as described more fully below.

Figure 2:
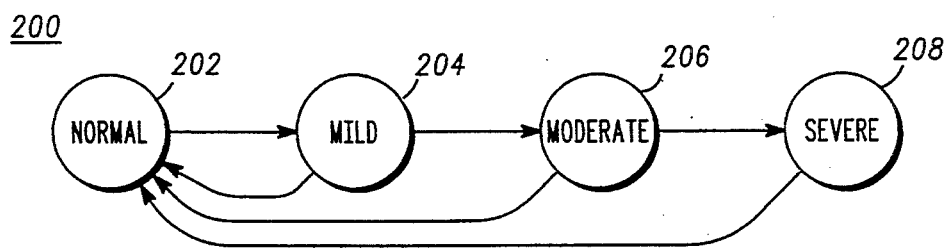
FIG. 2, numeral 200, illustrates typical queue group congestion level transitions in accordance with the present invention.

FIG. 2, numeral 200, illustrates typical queue group congestion level transitions in accordance with the present invention. As is clear from FIG. 2, hysteresis is introduced by only allowing queue group congestion level transitions to a normal state when congestion subsides. This hysteresis helps to return the queue group to a normal state more rapidly and provides a more stable operation of the control process. During normal operation, the congestion state of the queue group is 'normal'

(202). When the average length of any queue in the queue group exceeds a predetermined level for said queue, the congestion state of the queue group becomes 'mild (204)'. When, in the mild state, the average length of any queue in the queue group exceeds a predetermined level for the queue, the congestion state of the queue group becomes 'moderate' (206). When, in the moderate state, the average length of any queue in the queue group exceeds a predetermined level for the queue, the congestion state of the queue group becomes 'severe' (208). When, in the mild, moderate or severe states the average length of each queue in the queue group becomes less than a predetermined threshold established for said queue, the congestion state of the queue group becomes 'normal'. Note that the congestion state of the queue group cannot transition from 'severe' to 'moderate' or 'mild', and similarly cannot transition from 'moderate' to 'mild'.

FIG. 3, numeral 300, illustrates a protocol profile of a network, modelled according to the principles of the Open System Interconnection (OSI) Reference Model, utilizing the method of the present invention. End systems (302, 312) are illustrated, each having the seven layers (PH=PHYSICAL (1,8), DATA LINK (2,9), NETWORK (3,10), TRANSPORT (4,11), SESSION (5,12), PRESENTATION (6,13), and APPLICATION (7,14) for the functions of data communication as defined more fully, as is known in the art, in the International Organization for Standardization standard (ISO 7498) and in the International Telegraph and Telephone Consultative Committee's Recommendation X.200. EDGE NODES OF THE END SYSTEMS (304, 310) typically comprise at least a first layer being a physical layer (PH)(15,40) for input (15, 40) and for output (21, 34), a second layer being a data link layer (DL)(16, 39) operably coupled to an end system (302, 312) and being further subdivided into corresponding data link control (DLC) (18, 37), fast packet adaption (FPA) (19, 36), and fast packet relay (FPR) (20, 35) sub-layers operably coupled to at least a first intermediate node (306, 308) via the physical layer (PH) (21, 34), and a third layer (NETWORK) (17, 38). INTERMEDIATE NODES (306, ..., 308) typically comprise at least a first layer being a physical layer (PH) for input (22, 33) and for output (27, 28), a second layer having data link control (DLC) (25, 31), fast packet adaption (FPA) (24, 30), and fast packet relay (FPR) (23, 29) layers operably coupled to at least a first intermediate node (306, 308) via the physical layer (PH) (27, 28), and a third layer (NETWORK) (26, 32). Typically, only the PH layer and FPR and FPA sub-layers are active in the subnetwork during information transfer.

In a first embodiment of the present invention wherein the invention is used for congestion control interworking with frame relay, congestion control is rate-based making use of an unbuffered leaky bucket monitor/enforcer. Leaky buckets are known in the art. The role of the leaky bucket is to monitor a rate of traffic on each fast packet connection at a source edge of the network. By their nature these connections are bursty. Thus the leaky bucket measures an average rate. A time interval over which the leaky bucket averages rate is selectable. Said time interval determines a degree of burstiness allowed to the monitored connection. Typically a short averaging interval is used for connections with CBR-like demand characteristics, and a long averaging interval is used for more bursty connections (such as LAN interconnections).

Figure 4:
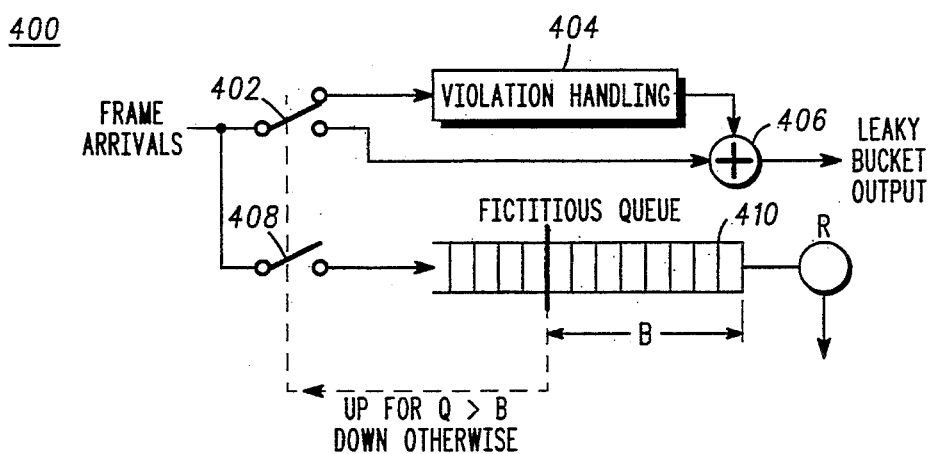
FIG. 4, numeral 400, illustrates a leaky bucket monitor/enforcer in accordance with the present invention where said monitor/enforcer is visualized as a fictitious queue model system.

A leaky bucket monitor/enforcer may be visualized (but typically not implemented) as a fictitious queue model system, illustrated in FIG. 4, numeral 400. Frames, comprised of at least one fast packet, are transmitted to two switches (402, 408), and are selectively directed (in parallel) from the first switch (402) to a summer (406) and from the second switch (408) to a fictitious queue (410) having a queue length Q where the arriving frame finds that Q is less than or equal to a preselected maximum allocation (bucket size) B. The fictitious queue (410) is served at a rate R. Where the frame finds that Q is less than or equal to B, the frame is allowed into the fast packet subnetwork (leaky bucket output). Where the arriving frame finds that Q is greater than B, the first switch directs the frame to a violation handling unit (404), and the second switch opens to block the frame from entering the fictitious queue (410).

When a frame is received in excess of the negotiated rate R and bucket size B, the violation handling unit (404) provides for using a field code F for marking a first fast packet in the frame for use by the FPA layer (to indicate to the destination edge node that the frame is in violation of the negotiated rate R and bucket size B), and the frame is allowed into the fast packet network. Also, the discard priority for the first fast packet of the frame is set to Last Discarded, as are all fast packets of non-violating frames. In addition, the discard priority of the second and subsequent fast packets of the frame is lowered.

Where a path that the frame is to follow is congested to a level that is greater than or equal to the predetermined level of congestion (as indicated by BCCL), the violation handling unit (404) treats the frame as a violating frame, discards it, and creates an empty fast packet with Last Discard priority in which field code F is marked (for indicating the violation to the destination edge node for that connection). A frame arriving at the leaky bucket with a frame relay discard eligibility (DE) bit set to 1 (due to a prior leaky bucket determination or set by the end system) is treated as a violating frame, as set forth above. Also, the DE bit of any frame marked by the leaky bucket at the source edge node and successfully delivered to the destination edge node is set at the destination edge node before the frame exits the subnetwork.

The monitor/enforcer at the source edge node determines the state of congestion along the forward direction of the connection by a feedback mechanism (described below). Where a path is congested to a level that is greater than or equal to the predetermined level of congestion, all but the first fast packet of the violating frame is discarded at the source edge node to remove the burden of discarding fast packets from the intermediate nodes since an intermediate node overburdened with discarding fast packets from several violating frames could result in poor performance for fast packets from well-behaved connections. Where the path is congested to a level that is less than the predetermined level of congestion, the discard priority for all but the first fast packet (which carries the marked field code F) of the violating frame is lowered. Where a link becomes congested to a predetermined level wherein packets are dropped, the fast packet discard priority is used to determine which fast packets are discarded first. Hence, fast packets from violating frames are discarded before any of those from fast packet connections that are within the predetermined negotiated rate R.

An excess rate parameter, R2, is used to switch the leaky bucket to the discard mode in an open loop fashion. Conceptually, there are two leaky buckets. A first leaky bucket is used to lower the fast packet discard priority if R is exceeded, and the second leaky bucket is used to discard frames at the source edge where R+R2 is exceeded. In effect, R2 represents an amount of excess traffic that can be discarded from an intermediate link node queue for a fast packet connection without degrading service provided to other fast packet connections sharing the link.

Figures 2, 5:
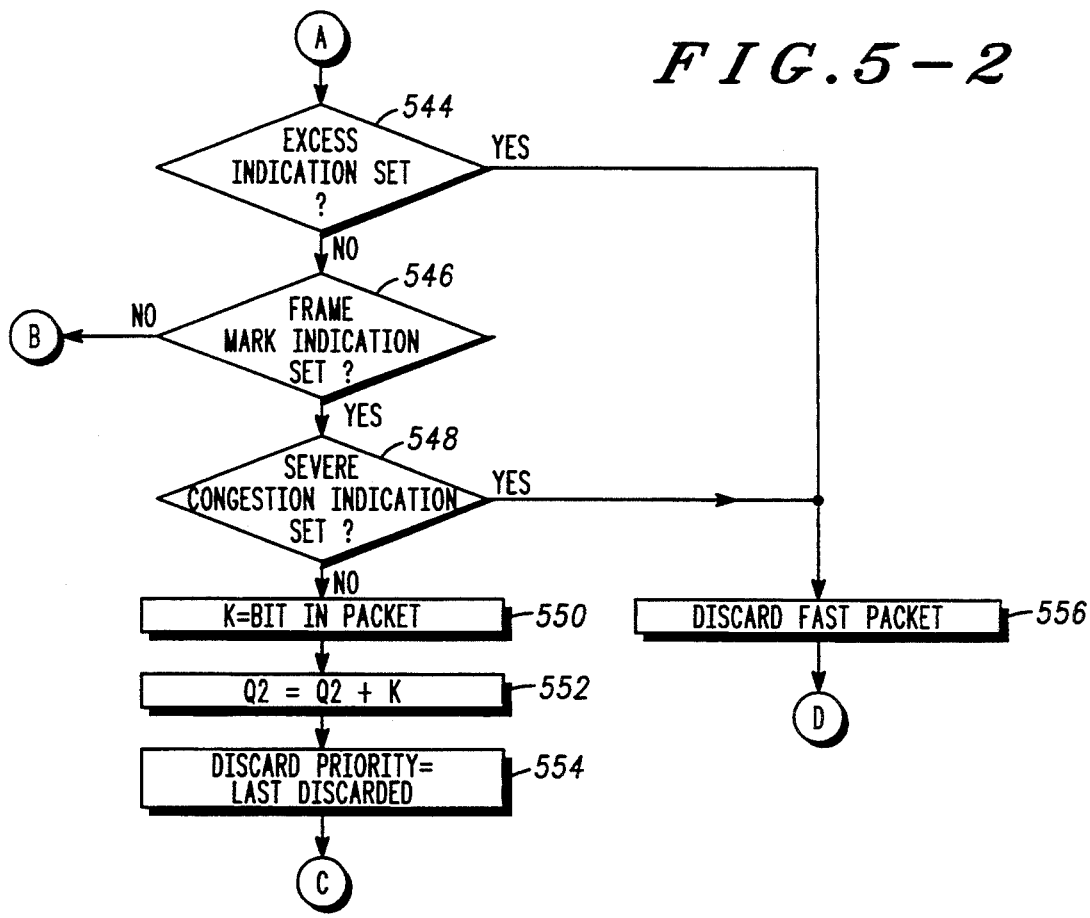
FIG. 5, numeral 500, sets forth a flow diagram illustrating a leaky bucket operation and discard priority marking in accordance with the present invention.

Leaky bucket operation and discard priority marking in accordance with the present invention is set forth in a flow diagram in FIG. 5, numeral 500. The terminology "where affirmative", used below, is defined to mean that a determination recited immediately before "where affirmative" has been executed, and the determination has been found to be positive. Upon receiving a fast packet (502), one of the following sets of steps are executed:

(A) determining whether the fast packet is a first packet in a frame (504) [see also step set (B)]; where affirmative, updating the leaky bucket queue length Q and setting a first clock (506); determining whether the discard eligibility bit (DE) is set (508) [see step set (G)]; where DE is unset, determining whether Q>B (510)[see step set (F)]; where affirmative, updating leaky bucket 2 with queue length Q2 and setting a second clock (512); determining whether Q2 is greater than a second preselected maximum allocation (bucket size) B2 (514)[see step set (H)]; where Q2≦B2, unset an excess indication (516); determining a number of bits (K) in the fast packet and updating Q2 such that Q2=Q2+K (517); setting frame mark indication (518); determining whether a severe congestion indication (greater than or equal to a predetermined congestion level) is set (520)[see step set (I)]; where severe congestion indication is unset, tagging (marking) an FPA frame state (522); setting a discard priority to Last Discarded (524); and transmitting the fast packet (526);

(B) where the fast packet is other than the first packet in the frame, determining whether excess indication is set (544)[see also step set (C)]; and where excess indication is set, and discarding the fast packet (556);

(C) where the forward path is congested and the packet is tagged, or alternatively, the forward path is severely congested, determining whether a frame mark indication is set (546) [see step set (D)]; where the frame mark indication is set, determining whether severe congestion level indication is set (548)[see step set (E)]; where the severe congestion indication is set, and discarding the fast packet (556);

(D) where the frame mark indication is unset, determining the number of bits (K) in the fast packet (538); updating Q such that Q=Q+K (540); setting a discard priority to Last Discarded (542); and transmitting the fast packet (526);

(E) where the severe congestion level indication is unset, determining the number of bits (K) in the fast packet (550); updating Q2 such that Q2=Q2+K (552); setting a discard priority to First Discarded (544); and transmitting the fast packet (526);

(F) where Q≦B, unsetting the frame mark indication (536); determining the number of bits (K) in the fast packet (538); updating Q such that Q=Q+K (540); setting a discard priority to Last Discarded (542); and transmitting the fast packet (526);

(G) where the DE bit is set in the frame relay frame, bypassing the step of determining whether Q>B in (A) above, and otherwise proceeding as set forth in step (A);

(H) where Q2>B2, setting an excess indication (528); and discarding the fast packet (530); and (I) where a severe congestion indication is set, discarding the fast packet (532); creating an empty packet (534); tagging (marking) an FPA frame state (522); setting a discard priority to Last Discarded (524); and transmitting the fast packet (526).

In a preferred embodiment, data fast packet connections are assigned to a transit internodal (head-of-line priority) queue based on an expected burst size of the source. The larger the expected burst entering the subnetwork, the lower the assigned priority queue and the higher an expected delay. Hence, interactive terminal traffic is typically assigned a high priority, and file transfers a low priority.

FIG. 6, numeral 600, illustrates a first embodiment of a system that utilizes the present invention for providing rate-based congestion control in an integrated fast packet network, each packet having at least a two bit congestion level field. The system comprises at least a source edge node unit (602), operably coupled to receive the fast packet traffic for transmission over the network, said unit having a negotiated throughput rate, for rate-based monitoring and rate enforcement of the traffic utilizing a monitor/enforcer unit that provides a fast packet discard priority, a transit node unit (604), operably coupled to the source edge node unit, having a plurality of intermediate nodes for providing at said nodes fast packet transmission paths, and a destination edge node unit (606), operably coupled to the transit node unit (604), for providing at least a correlated congestion level and for outputting reassembled frames of transmitted fast packets at a realized throughput rate, such that the realized throughput rate of the transmitted fast packets may exceed the predetermined throughput rate where the fast packets utilize unused or unallocated network capacity. Since an end system typically both transmits and receives frames related to the same end-to-end communication, an end system is both a source end system in one direction of communication and a destination end system in the other, and, similarly, an edge node is both a source edge node in one direction of communication and a destination edge node in the other.

The source edge node unit (602) includes at least a monitor/enforcer unit (608), a BCCL state detection unit (612) and a frame relay BECN marking unit (610). The monitor/enforcer unit at least performs leaky bucket operation and discard priority marking. Typically, the discard priority field of a fast packet has two possible values, the one being 'Last Discarded' and the other being 'First Discarded'. When a frame is received in excess of previously negotiated rate R and bucket size B, the discard priority of the first fast packet comprising the frame is set to Last Discarded and that of subsequent fast packets is set to First Discarded. However, if the BCCL state detection unit (612) indicates that congestion along the path is 'severe', the frame is discarded and a control fast packet is sent, or if the previously negotiated excess rate R2 and excess bucket size B2 is exceeded, the frame is discarded and no control fast packet is sent. When a control fast packet is received in the backward direction (i.e., from the destination edge node) the BCCL state detection unit (612) stores the BCCL from said control fast packet. When the first fast packet of a frame is received in the backward direction, the BECN bit of said frame is set if the BCCL is equal to or greater than a predetermined congestion level.

The transit node unit includes at least congestion-reducing unit (614) for determining a transit node queue group (TNQG) congestion level for fast packets and for discarding fast packets based on said TNQG congestion level and on said discard priority. The transit node unit generally further includes a low pass filter (616), operably coupled to the congestion-reducing unit (614), for providing a measurement that allows congestion determination of a particular queue. Typically, said measurement is obtained by averaging the sampled queue depth that is input from a queue depth sampler (618).

The destination edge node unit (606) generally comprises at least: a connection congestion level (CL) state determiner (620), operably coupled to the transit node means, for determining a connection congestion level (CL) state; a fast packet adaption (FPA) frame tag state determiner (622), operably coupled to the source edge node means, for determining a FPA frame tag state; a correlated CL determiner (626), operably coupled to the connection CL state determiner (620) and to the FPA frame tag state determiner (622), for utilizing the CL state and the FPA frame tag state to determine a correlated congestion level that provides a backward correlated congestion level (BCCL) state to a BCCL signal unit (624) that is operably coupled to provide a BCCL state indication to the source edge node unit (602), as described more fully herein, and that further provides a forward correlated congestion level (FCCL) to a FCCL state determiner (628) that is operably coupled to provide a frame relay forward explicit congestion notification (FECN) to a frame relay FECN marking unit (630) that outputs the reassembled frames of transmitted fast packets.

Thus, there is a one-to-one mapping between a frame relay connection and its supporting fast packet connection such that the frame relay connection is allowed to exceed its negotiated (predetermined) throughput rate R without suffering any negative consequences if there is unused capacity along its assigned route. Where the network is congested, the negotiated throughput rate, as monitored by the leaky bucket, determines which connections are in violation, and sets fast packet discard priorities that are used by transit nodes to distinguish violating and non-violating frame traffic in the subnetwork.

The closed-loop feedback system of the first embodiment provides congestion notification across a frame relay interface. At the destination edge node, the congestion state of the forward connection is maintained by examining a congestion level (CL) field in an arriving fast packet for that connection. The congestion state is correlated with the frame tag state that is determined by checking the first fast packet of each frame for a field code F. The frame tag state is held for a predetermined number of consecutive frames (e.g., 10) after a frame is received with the field code F. For example, correlated congestion level for forward and backward directions may be set as shown in the table below.

| FRAME TAG STATE | FAST PACKET CONNECTION CONGESTION LEVEL | FORWARD CORRELATED CONGESTION LEVEL | FECN BIT SET | BACKWARD CORRELATED CONGESTION LEVEL | BECN BIT SET |
| --- | --- | --- | --- | --- | --- |
| No | Normal | Normal | No | Normal | No |
| No | Mild | Normal | No | Normal | No |
| No | Moderate | Normal | No | Normal | No |
| No | Severe | Moderate | Yes | Moderate | Yes |
| Yes | Normal | Normal | No | Normal | No |
| Yes | Mild | Mild | Yes | Normal | No |
| Yes | Moderate | Moderate | Yes | Moderate | Yes |
| Yes | Severe | Severe | Yes | Severe | Yes |

In this embodiment the frame relay forward explicit congestion notification (FECN) bit is set on frames crossing the frame relay interface at the destination edge whenever the forward correlated congestion level (FCCL) is in a mild, moderate or severe state. The correlated congestion is returned to the source via a fast packet containing no user data and only one of the three field codes (normal, moderate, severe) for backward congestion, such packet being sent only upon change of congestion level or after a predetermined number of packets have been received since the last such packet was sent. Here, the normal and mild FCCL states are combined to form a backward correlated congestion level (BCCL) normal state. The frame relay backward explicit congestion notification (BECN) bit is set for all frames crossing the frame relay interface to the source whenever the BCCL state is moderate or severe. Also, if the BCCL state is severe, the leaky bucket begins to strictly enforce the negotiated throughput rate, R, by discarding the violating frames. The frame tag state is still conveyed to the destination edge node for each of these discarded frames by creating an empty fast packet containing the field code F tag. Since the BCCL control signalling is via the unreliable fast packet relay service, it must be reenforced by repeating the indication to compensate for control fast packets lost in the subnetwork. A control fast packet is sent in a backward direction whenever the BCCL state changes or, alternatively, after a predetermined number of frames have been received in a forward direction. The destination edge congestion correlation, FECN marking, backward congestion indication, and BECN marking functions are described more fully below.

Figure 7:
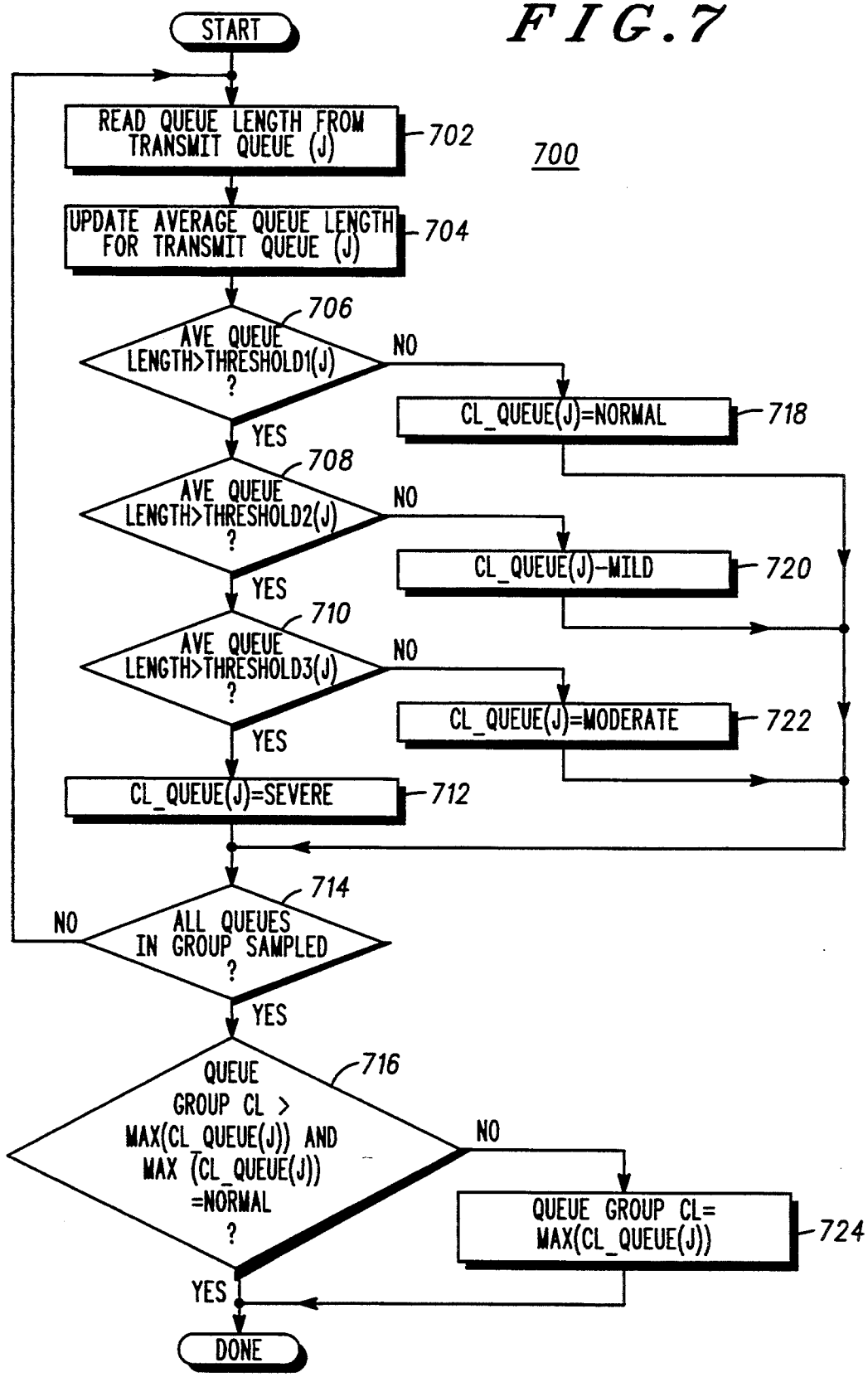
FIG. 7, numeral 700, sets forth a flow chart illustrating steps for sampling a transit queue group for congestion levels in accordance with the method of the present invention.

FIG. 7, numeral 700, sets forth a flow chart illustrating steps for sampling a transit queue group for congestion levels in accordance with the method of the present invention. For each queue group that is sampled, one of the following sets of steps is executed (in accordance with determinations as set forth below):

(A) reading (sampling) a queue length from a transit queue (702); updating an average queue length for the transit queue (704); determining whether the average (i.e., filtered) queue length is greater than a first predetermined threshold1 (706)[see step set (B)]; where affirmative, determining whether the average queue length is greater than a second predetermined threshold2 (708)[see step set (C)]; where affirmative, determining whether the average queue length is greater than a third predetermined threshold3 (710)[see step set (D)]; where affirmative, setting the congestion level for the queue to severe (712); determining whether all queues in a selected group have been sampled (714) [see step set (E)]; and, where affirmative, determining whether the queue group congestion level (CL) is greater than a maximum congestion level in the queue group [see step set (F)];

(B) in step (A) where the average queue length is less than or equal to the threshold1, setting the CL to normal and proceeding to the step of determining whether all queues in the selected group have been sampled (714) in step (A);

(C) in step (A) where the average queue length is less than or equal to the threshold2, setting the CL to mild and proceeding to the step of determining whether all queues in the selected group have been sampled (714) in step (A);

(D) in step (A) where the average queue length is less than or equal to the threshold3, setting the CL to moderate and proceeding to the step of determining whether all queues in the selected group have been sampled (714) in step (A);

(E) in step (A) where at least one queue in the selected group is unsampled, proceeding to the step of reading a queue length from a transit queue (702) in step (A); and (F) in step (A) where the previous value of the queue group congestion level (CL) is less than the greatest congestion level of any queue in the queue group, or if the congestion levels of all queues in the queue group are 'normal', setting the queue group congestion level to the greatest congestion level of any queue in the queue group (724). Otherwise, the queue group CL is unchanged.

Figure 8:
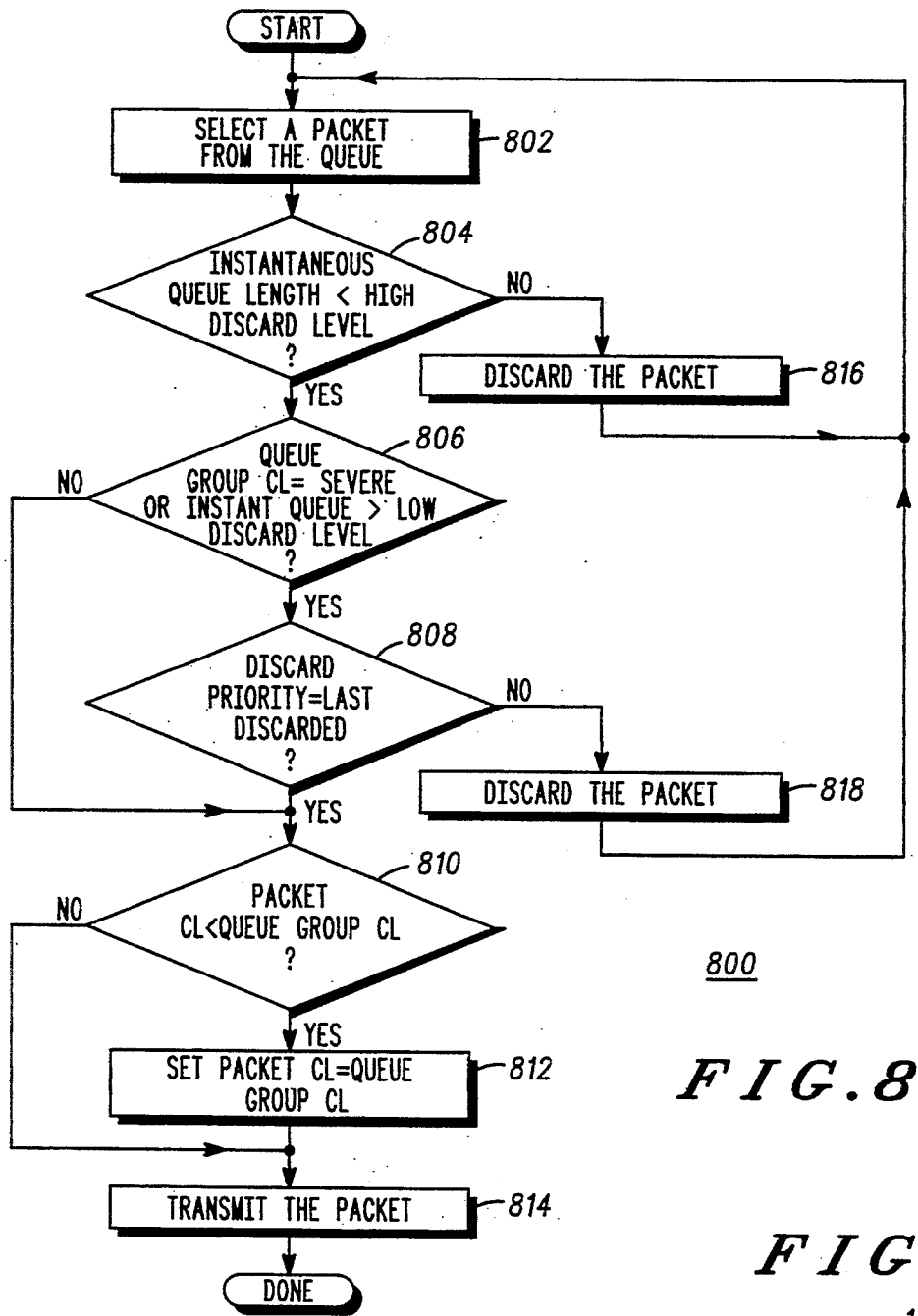
FIG. 8, numeral 800, sets forth a flow chart showing steps for fast packet discarding and fast packet congestion level marking at a data transmit queue in accordance with the present invention.

A flow chart for illustrating steps for packet discarding and packet congestion level marking at a data transmit queue in accordance with the present invention is set forth in FIG. 8, numeral 800. For each data packet to be transmitted, one of the following sets of steps is followed (in accordance with determinations as set forth below):

(A) selecting a packet from a queue of data packets to be transmitted (802); determining whether an instantaneous queue length is less than a predetermined high discard level (804)[see step set (B)]; where affirmative, determining whether the queue group congestion level (CL) is severe, or alternatively, whether the instantaneous queue length is greater than a predetermined low discard level (806)[see step set (C)]; where affirmative, determining whether the discard priority is Last Discarded (808)[see step set (D)]; where affirmative, determining whether the packet CL is less than the queue group CL (810)[see step set (E)]; where affirmative, setting the packet CL equal to the queue group CL (812); and transmitting the packet (814);

(B) in step (A) where the instantaneous queue length is greater than or equal to the predetermined high discard level, discarding the packet (816); and proceeding to selecting another packet from a queue of data packets to be transmitted (802) in step (A);

(C) in step (A) where the queue group congestion level (CL) is other than severe, and the instantaneous queue length is less than or equal to a predetermined low discard level, proceeding to determining whether the packet CL is less than the queue group CL (810) in step (A);

(D) in step (A) where the discard priority is other than the Last Discarded, discarding the packet (818); and proceeding to select another packet from a queue of fast packets to be transmitted (802) in step (A); and (E) in step (A) where the packet CL is greater than or equal to the queue group CL, transmitting the packet (814).

Figure 9:
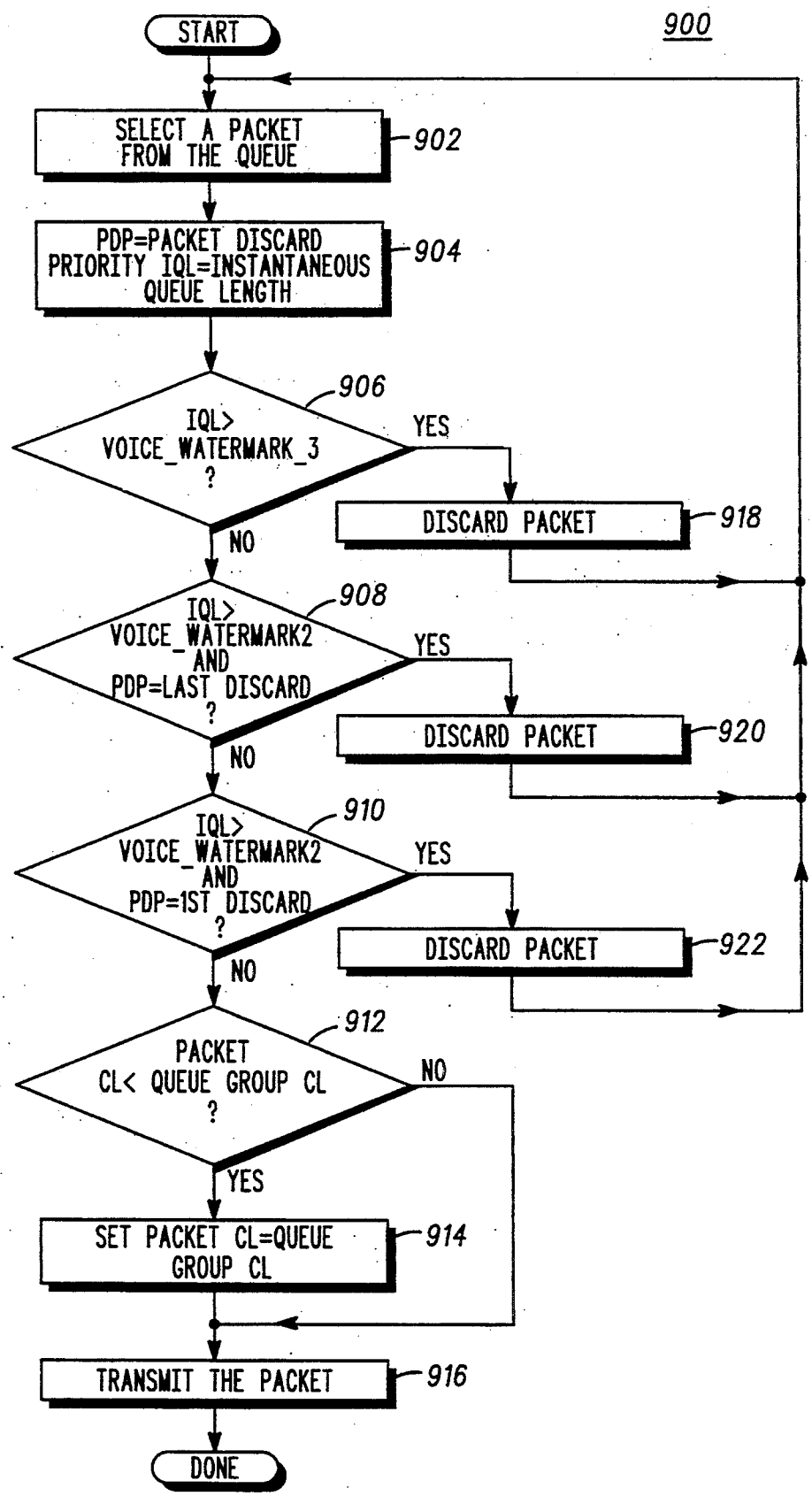
FIG. 9, numeral 900, sets forth a flow chart showing steps for fast packet discarding and fast packet congestion level marking at a voice transmit queue in accordance with the present invention.

A flow chart for illustrating steps for packet discarding and packet congestion level marking at a voice transmit queue in accordance with the present invention is set forth in FIG. 9, numeral 900. Voice fast packets are typically not processed at the source edge node by the monitor/enforcer. However, the packet discard priority is typically determined by a speech coding unit, based on the significance of the packet for purposes of reconstruction of the speech signal. For each voice packet to be transmitted, one of the following sets of steps is followed (in accordance with determinations as set forth below):

(A) selecting a packet from a queue of voice packets to be transmitted (902); setting variable PDP equal to a packet discard priority and variable IQL to the instantaneous queue length (904); determining whether IQL is greater than a predetermined voice watermark3 (906)[see step set (B)]; where the IQL is less than or equal to the predetermined voice watermark3, determining whether IQL is greater than a predetermined voice watermark2 and PDP is unequal to Last Discard (908)[see step set (C)]; where IQL is less than or equal to the predetermined voice watermark2 or PDP is equal to Last Discarded, determining whether IQL is greater than a predetermined voice watermark1 and PDP equals a first discard setting (910)[see step set (D)]; where IQL is less than or equal to the predetermined voice watermark1 or PDP is unequal to First Discarded, determining whether the packet CL is less than the queue group CL (912)[see step set (E)]; where affirmative, setting the packet CL equal to the queue group CL (914); and transmitting the packet (916);

(B) in step (A) where the IQL is greater than the predetermined voice watermark3, discarding the packet (918); and proceeding to selecting a packet from a queue of voice packets to be transmitted (902) in step (A);

(C) in step (A) where the IQL is greater than the predetermined voice watermark2 and PDP is unequal to last discard, discarding the packet (920); and proceeding to selecting a packet from a queue of voice packets to be transmitted (902) in step (A);

(D) in step (A) where the IQL is greater than the predetermined voice watermark1, and PDP is equal to first discard, discarding the packet (922); and proceeding to selecting a packet from a queue of voice packets to be transmitted (902) in step (A);

(E) in step (A) where the packet CL is greater than or equal to the queue group CL, transmitting the packet (916).

Figure 10:
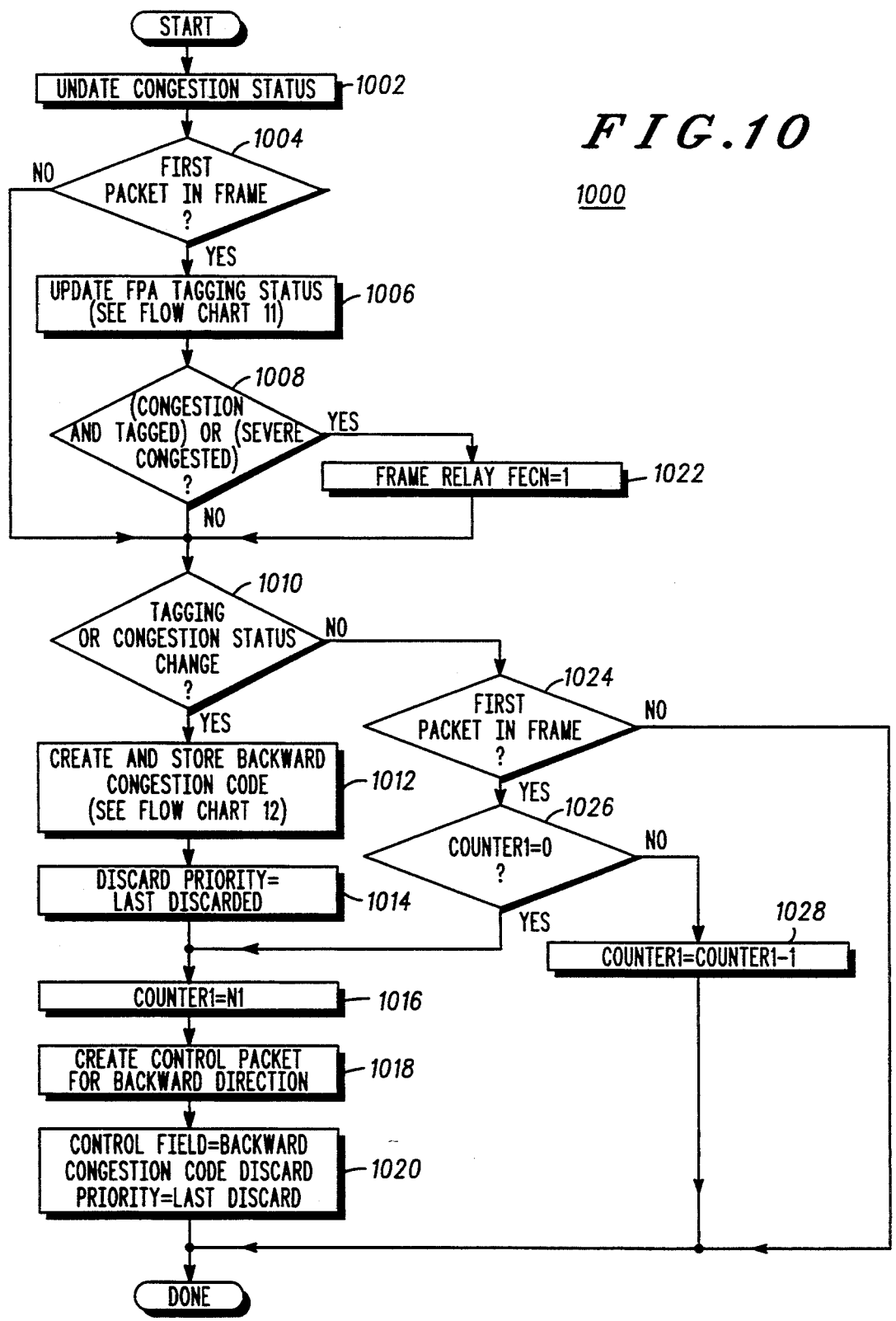
FIG. 10, numeral 1000, sets forth a flow chart illustrating steps for updating congestion and tagging status, forward explicit congestion notification (FECN) marking and creation of backward control fast packet at a destination edge node in accordance with the method of the present invention.
Figure 11:
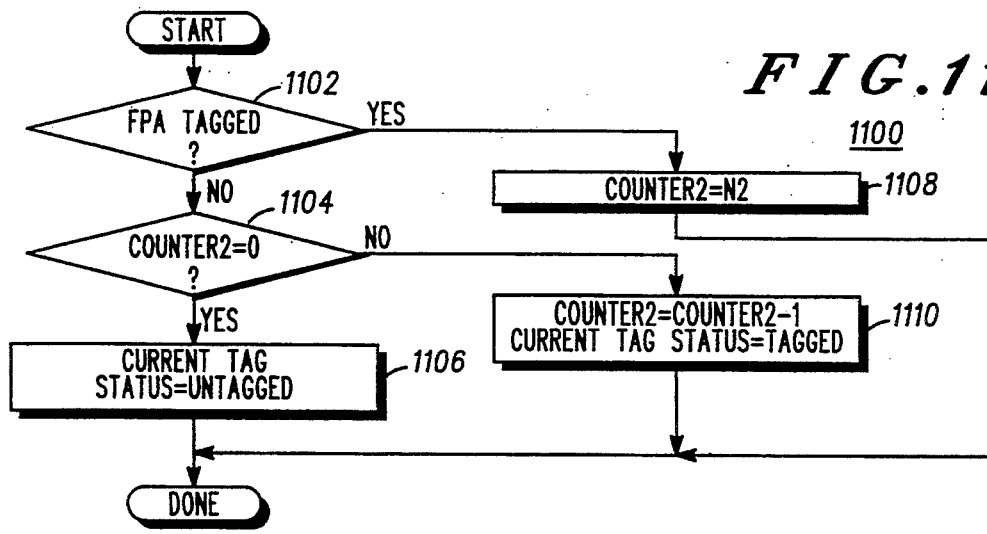

A flow chart for illustrating steps for updating congestion and tagging status, forward explicit congestion notification (FECN) marking and creation of backward control packet at a destination edge node in accordance with the method of the present invention is set forth in FIG. 10, numeral 1000. For each received outbound packet, one of the following sets of steps is followed (in accordance with determinations as set forth below):

(A) updating the congestion status of the received outbound fast packet (1002); determining whether the fast packet is a first fast packet in the frame (1004)[see step set (B)]; where affirmative, updating a fast packet adaption tagging status (state) (1006); determining whether the outbound packet is congested and tagged, or alternatively, severely congested (1008)[see step set (C)]; where the forward path is uncongested or the packet is untagged, and where the forward path is other than severely congested, determining whether the tagging or congestion status has changed (1010)[see step set (D)]; where the tagging or congestion status has changed, creating and storing a backward congestion code (1012); storing a current tag and congestion status (1014); setting a counter1 to a predetermined number N1 (1016); creating a control packet for a backward direction (1018); and setting a control field for a backward congestion code and setting the control packet discard priority to Last Discard (1020);

(B) in step (A) where the outbound packet is other than a first packet in the frame, proceeding to the step of determining whether the tagging or congestion status has changed (1010) in step (A);

(C) in step (A) where the forward path is congested and the packet is tagged, or alternatively, the forward path is severely congested, setting a FECN bit in the frame relay frame;

(D) in step (A), where tagging and congestion status are unchanged, determining whether the packet is the first packet in the frame (1024)[see step set (E)]; where the packet is the first packet in the frame, determining whether a counter1 is set to zero (1026); where the counter1 is set to zero, proceeding to the step of setting counter1 to the predetermined number N1 (1016) of step (A);

(E) in step (D) where the packet is other than the first packet in the frame, ending the status determining steps; and (F) in step (D) where the counter1 is set to other than zero, setting the counter1 to counter1—1.

Figure 11:
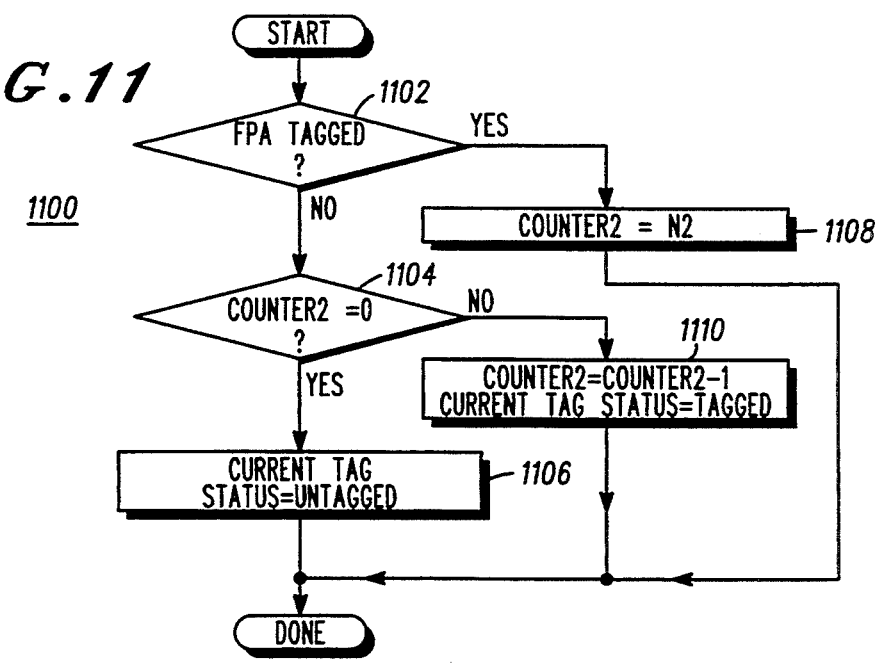
FIG. 11, numeral 1100, is flow chart illustrating steps for updating a tag status when receiving a first fast packet in a frame at a destination edge node in accordance with the method of the present invention.

A flow chart for illustrating steps for updating a tag status when receiving a first packet in a frame at a destination edge node in accordance with the method of the present invention is set forth in FIG. 11, numeral 1100. For each first packet in a frame received, one of the following sets of steps is followed (in accordance with determinations as set forth below):

(A) determining whether the fast packet adaption (FPA) state is marked (tagged) (1102)[see step set (B)]; where the FPA is untagged, determining whether a counter2 is set to zero (1104)[see step set(C)]; where affirmative, setting a current tag status equal to untagged (1106);

(B) where the FPA is tagged, setting the counter2 equal to a predetermined second number N2(1108); and (C) where the counter2 is greater than 0, decrementing counter2 and, setting the current tag status equal to tagged (1110).

Figure 12:
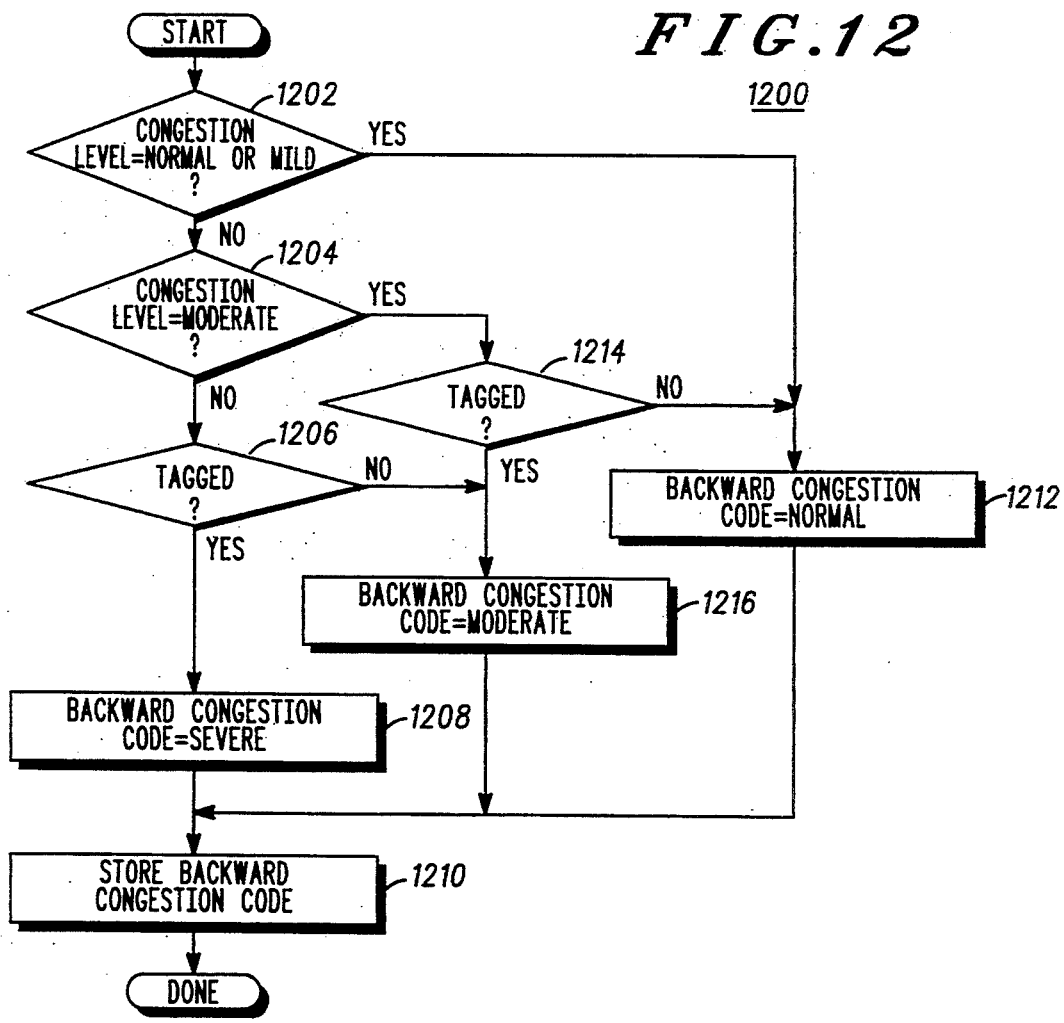
FIG. 12, numeral 1200, is a flow chart illustrating steps for creating and storing a backward congestion code at a destination edge node in accordance with the method of the present invention.

A flow chart for illustrating steps for creating and storing a backward congestion code at a destination edge node in accordance with the method of the present invention is set forth in FIG. 12, numeral 1200. For each packet having a tag or congestion status changed, one of the following sets of steps is followed (in accordance with determinations as set forth below):

(A) determining whether a congestion level (CL) is one of: normal and mild (1202)[see step set (B)]; where CL is other than one of normal and mild, determining whether CL is moderate (1204)[see step set (C)]; where CL is other than one of normal, mild, and moderate, determining whether the tag status (state) is tagged (1206)[see step set (D)]; where the tag status is tagged, setting a backward congestion code equal to severe (1208); storing the backward congestion code (1210);

(B) in step (A) where the congestion level is equal to one of normal and mild, setting the backward congestion code equal to normal (1212) and storing the backward congestion code (1210);

(C) in step (A) where the congestion level is equal to moderate, determining whether the tag status is tagged (1214)[see step set (E)]; where the tag status is tagged, setting the backward congestion code equal to moderate (1216); and storing the backward congestion code (1210);

(D) in step (A) where the tagged status is untagged, setting the backward congestion code equal to moderate (1216); and storing the backward congestion code (1210);

(E) in step (C) where the tag status is untagged, setting the backward congestion code equal to normal (1212); and storing the backward congestion code (1210).

Figure 13:
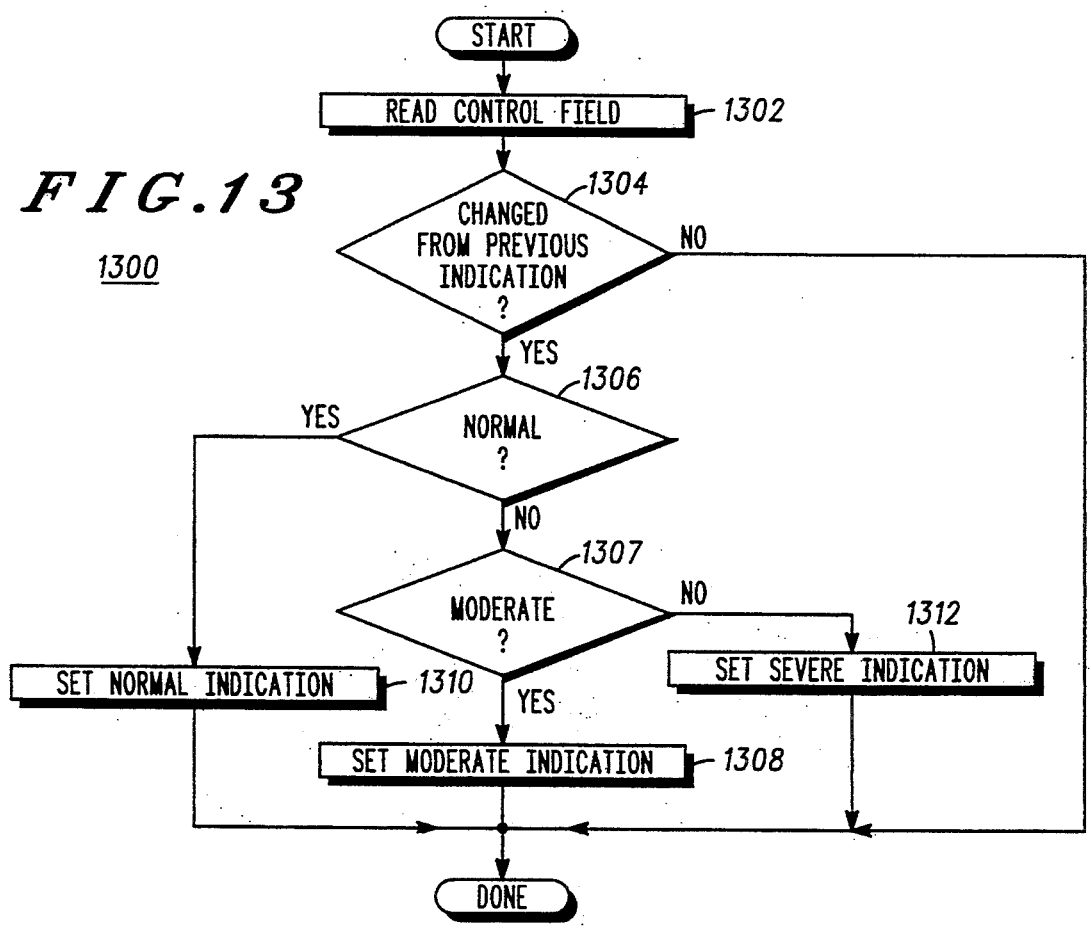
FIG. 13, numeral 1300, is a flow chart illustrating steps for receiving a control fast packet in a backward direction at a source edge node in accordance with the method of the present invention.

A flow chart for illustrating steps for receiving a control packet in a backward direction at a source edge node in accordance with the method of the present invention is set forth in FIG. 13, numeral 1300. For each control packet received, one of the following sets of steps is followed (in accordance with determinations as set forth below):

(A) reading a control field of the received control packet (1302); determining whether the control field has changed from a previous backward congestion indication (value)(1304)[see step set (B)]; where affirmative, determining whether the control field is a normal value (1306)[see step set (C)]; where the control field is other than normal, determining whether the control field is a moderate value (1307)[see step set (D)]; where the control field is moderate, setting the backward congestion indication to a moderate indication ( 1308);

(B) in step (A) where the control field is unchanged from a previous backward congestion indication (value), ceasing taking further steps to set the control field;

(C) in step (A) where the control field is a normal value, setting the backward congestion indication to a normal indication (1310); and (D) in step (A) where the control field is other than a normal value and other than a moderate value, setting the backward congestion indication to a severe indication (1312).

Figure 14:
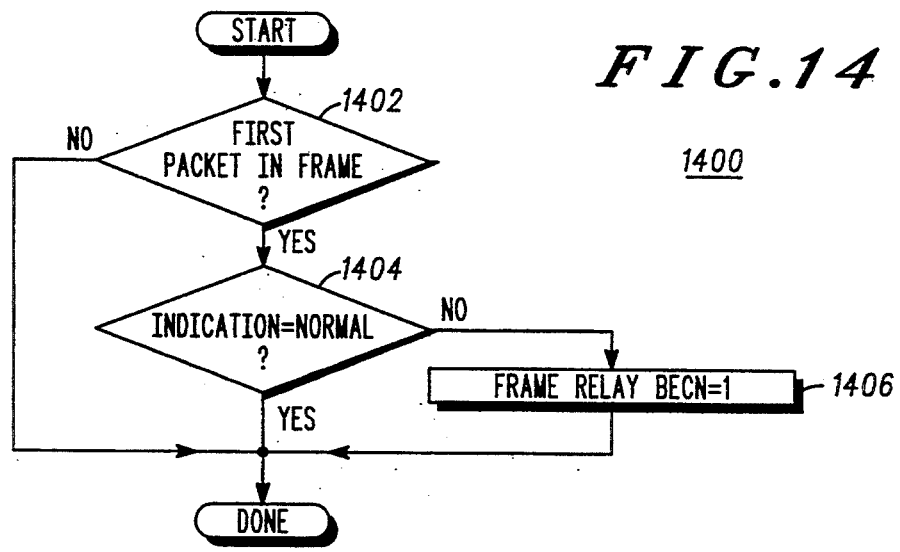
FIG. 14, numeral 1400, is a flow chart illustrating steps for receiving a data fast packet in a backward direction and setting a backward explicit congestion notification (BECN) at a source edge node in accordance with the method of the present invention.

A flow chart for illustrating steps for receiving a data fast packet in a backward direction and setting a backward explicit congestion notification (BECN) bit at a source edge node in accordance with the method of the present invention is set forth in FIG. 14, numeral 1400. For each data fast packet received in a backward direction, one of the following sets of steps is followed (in accordance with determinations as set forth below):

(A) determining whether the packet is a first packet in its frame (1402)[see step set (B)]; where the packet is a first packet in its frame, determining whether the backward congestion indication is equal to normal (1404)[see step set (C)]; where the backward congestion indication is equal to normal, ceasing taking further steps to set BECN;

(B) in step (A) where the packet is other than a first packet in its frame, ceasing taking further steps to set the BECN bit; and (C) in step (A) where the backward congestion indication is indicated as other than normal, setting the frame relay BECN bit to a set state (1406).

Figure 15:
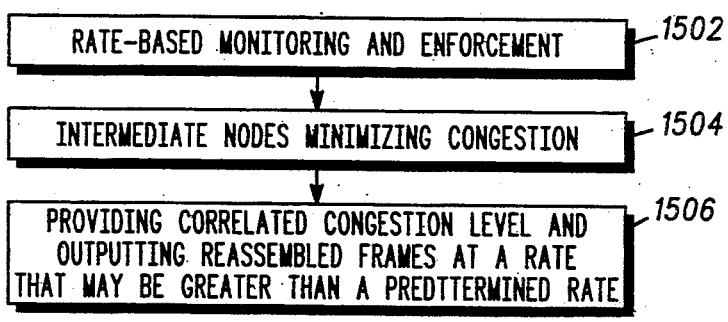
FIG. 15, numeral 1500, shows the steps of the method of the present invention for providing rate-based congestion control in an integrated fast packet network, each fast packet capable of conveying a plurality of levels of congestion and having a predetermined throughput rate.

Thus, FIG. 15, numeral 1500, shows the steps of the method of the present invention for providing rate-based congestion control in an integrated fast packet traffic network, each packet having at least a two bit congestion level field and a predetermined throughput rate, comprises at least the steps of: rate-based monitoring and rate enforcing the traffic utilizing a monitor/enforcer that provides a fast packet discard priority (1502), providing, at a plurality of intermediate nodes, fast packet transmission paths (1504), and providing at least a correlated congestion level and for outputting reassembled frames of transmitted fast packets at a realized throughput rate (1506), such that the realized throughput rate of the transmitted fast packets may exceed the predetermined throughput rate where the fast packets utilize available network capacity.

In a second embodiment, a system carrying transparent framed traffic utilizes the method of the present invention. In this embodiment, the same function is provided as described above, except that the access interface does not support FECN or BECN. That is, the congestion control will still be closed loop, but will have no way of informing the source or destination to slow its rate.

In a third embodiment, a system carries point-to-point simplex traffic, or alternatively, point-to-multipoint simplex traffic. In this embodiment there is no reverse path to close the feedback loop. Here, the leaky bucket continues to lower the fast packet discard priority and to discard entire frames, but now does so in an open-loop fashion. The excess rate parameter, R2, is used to switch the leaky bucket to a discard mode. As indicated above, conceptually, there are two leaky buckets, the first being used to lower the fast packet discard priority where R is exceeded, and the second being used to discard frames at the source edge where R+R2 is exceeded. In the point-to-point embodiment, the leaky bucket operates identically to that of the frame relay service described above.

Obviously numerous modification and variations of the present invention are possible in light of the above teachings. It is therefore to be understood that within the scope of the appended claims, the invention may be practiced otherwise than as specifically described herein.

We claim:

1. A system for providing rate-based congestion control of fast packet traffic having a plurality of fast packets in an integrated fast packet network, each packet being capable of conveying a plurality of levels of congestion indication, comprising at least:

source edge node means, operably coupled to receive the fast packet traffic for transmission over the network, said source edge node means having a predetermined throughput rate, for rate-based monitoring and rate enforcement of the fast packet traffic utilizing a leaky bucket monitor/enforcer means that monitors the fast packet traffic and determines and marks a fast packet discard priority for each fast packet, transit node means, operably coupled to the source edge node means, having a plurality of intermediate nodes for providing at said intermediate nodes fast packet transmission paths, and destination edge node means, operably coupled to the transit node means, for providing at least a correlated congestion level and for outputting traffic at a realized throughput rate, such that where fast packets utilize unallocated or unused network capacity, the realized throughput rate of transmitted fast packets exceeds a negotiated throughput rate, wherein the destination edge node means further includes a backwards correlated congestion level state determiner, i.e., BCCL STATE DET, operably coupled to provide a backwards correlated congestion level, i.e., BCCL, state to the leaky bucket monitor/enforcer means via a control fast packet wherein the transit node means further includes at least congestion-reducing means for determining a transit node queue group, i.e., TNQG, congestion level for fast packets and for discarding fast packets based on said transit node queue group congestion level and on said fast packet discard priority.

2. The system of claim 1 wherein the means for determining a transit node queue group congestion level and for discarding fast packets based on said transit node queue group on said discard priority incorporates hysteresis for state transitions.

3. The system of claim 1 wherein the leaky bucket monitor/enforcer means that provides a fast packet discard priority comprises at least said leaky bucket monitor/enforcer for at least determining and marking said fast packet discard priority such that, when a frame is received in excess of a previously negotiated rate, R, and bucket size, B, the discard priority of a first fast packet comprising said frame is set to 'last discarded' and the discard priority of subsequent fast packets is set to 'first discarded'.

4. The system of claim 3, further including means for, when said frame is received in excess of a previously negotiated rate R2 and bucket size B2, discarding said frame.

5. The system of claim 1, wherein the transit node means further includes a low pass filter that is operably coupled to provide a measurement to the congestion reducing means, wherein the measurement allows congestion determination of a particular queue.

6. The system of claim 5, wherein the measurement that allows congestion determination of the particular queue is obtained by averaging a sampled queue depth that is input from a queue depth sampler.

7. The system of claim 1 wherein the congestion level field is two bits or an equivalent of two bits.

8. A system for providing rate-based congestion control of fast packet traffic having a plurality of fast packets in an integrated fast packet network, each packet being capable of conveying a plurality of levels of congestion indication, comprising at least;

source edge node means, operably coupled to receive the fast packet traffic for transmission over the network, said source edge node means having a predetermined throughput rate, for rate-based monitoring and rate enforcement of the fast packet traffic utilizing a leaky bucket monitor/enforcer means that monitors the fast packet traffic and determines and marks a fast packet discard priority for each fast packet, transit node means, operably coupled to the source edge node means, having a plurality of intermediate nodes for providing at said intermediate nodes fast packet transmission paths, and destination edge node means, operably coupled to the transit node means, for providing at least a correlated congestion level and for outputting traffic at a realized throughput rate, such that where fast packets utilize unallocated or unused network capacity, the realized throughput rate of transmitted fast packets exceeds a negotiated throughput rate, wherein the destination edge node means further includes a backwards correlated congestion level state determiner, i.e., BCCL STATE DET, operably coupled to provide a backwards correlated congestion level, i.e., BCCL, state to the leaky bucket monitor/enforcer means via a control fast packet further including a frame relay backwards explicit congestion notification, i.e., BECN, marking unit, operably coupled to the BCCL STATE DET, for setting a BECN bit when the backward correlated congestion level is equal to or greater than a predetermined congestion level.

9. A system for providing rate-based congestion control of fast packet traffic having a plurality of fast packets in an integrated fast packet network, each packet being capable of conveying a plurality of levels of congestion indication, comprising at least:

source edge node means, operably coupled to receive the fast packet traffic for transmission over the network, said source edge node means having a predetermined throughput rate, for rate-based monitoring and rate enforcement of the fast packet traffic utilizing a leaky bucket monitor/enforcer means that monitors the fast packet traffic and determines and marks a fast packet discard priority for each fast packet, transit node means, operably coupled to the source edge node means, having a plurality of intermediate nodes for providing at said intermediate nodes fast packet transmission paths, and destination edge node means, operably coupled to the transit node means, for providing at least a correlated congestion level and for outputting traffic at a realized throughput rate, such that where fast packets utilize unallocated or unused network capacity, the realized throughput rate of transmitted fast packets exceeds a negotiated throughput rate, wherein the destination edge node means further includes a backwards correlated congestion level state determiner, i.e., BCCL STATE DET, operably coupled to provide a backwards correlated congestion level, i.e., BCCL, state to the leaky bucket monitor/enforcer means via a control fast packet further including a means for discarding fast packets that is operably coupled to monitor fast packet traffic in the source edge node means of the integrated fast packet network and for discarding fast packets when a BCCL state that indicates level of congestion is greater than a predetermined congestion value.

10. A system for providing rate-based congestion control of fast packet traffic A method for providing rate-based congestion control of fast packet traffic having a plurality of fast packets in an integrated fast packet network, each packet being capable of conveying a plurality of levels of congestion indication, comprising at least;

source edge node means, operably coupled to receive the fast packet traffic for transmission over the network, said source edge node means having a predetermined throughput rate, for rate-based monitoring and rate enforcement of the fast packet traffic utilizing a leaky bucket monitor/enforcer means that monitors the fast packet traffic and determines and marks a fast packet discard priority for each fast packet, transit node means, operably coupled to the source edge node means, having a plurality of intermediate nodes for providing at said intermediate nodes fast packet transmission paths, and destination edge node means, operably coupled to the transit node means, for providing at least a correlated congestion level and for outputting traffic at a realized throughput rate, such that where fast packets utilize unallocated or unused network capacity, the realized throughput rate of transmitted fast packets exceeds a negotiated throughput rate, wherein the destination edge node means comprises at least:

a connection congestion level, i.e., CL, state determiner, operably coupled to the transit node means, for determining a connection congestion level state;

a fast packet adaption frame tag state determiner, operably coupled to the transit node means, for determining a fast packet adaption frame tag state;

a correlated congestion level, i.e, CL, determiner, operably coupled to the connection congestion level state determiner and to the fast packet adaption frame tag state determiner, for utilizing the congestion level state and the fast packet adaption frame tag state to determine a correlated congestion level that provides a backward correlated congestion level, i.e., BCCL, state to a backward correlated congestion level signal unit that is operably coupled to provide a backward correlated congestion level state indication to the source edge node means and that further provides a forward correlated congestion level, i.e., FCCL, to a forward correlated congestion level state determiner.

11. A system for providing rate-based congestion control of fast packet traffic having a plurality of fast packets in an integrated fast packet network, each packet being capable of conveying a plurality of levels of congestion indication, comprising at least:

source edge node means, operably coupled to receive the fast packet traffic for transmission over the network, said source edge node means having a predetermined throughput rate, for rate-based monitoring and rate enforcement of the fast packet traffic utilizing a leaky bucket monitor/enforcer means that monitors the fast packet traffic and determines and marks a fast packet discard priority for each fast packet, transit node means, operably coupled to the source edge node means, having a plurality of intermediate nodes for providing at said intermediate nodes fast packet transmission paths, and destination edge node means, operably coupled to the transit node means, for providing at least a correlated congestion level and for outputting traffic at a realized throughput rate, such that where fast packets utilize unallocated or unused network capacity, the realized throughput rate of transmitted fast packets exceeds a negotiated throughput rate, wherein the destination edge node means comprises at least:

a connection congestion level, i.e., CL, state determiner, operably coupled to the transit node means, for determining a connection congestion level state;

a fast packet adaption, i.e., FPA, frame tag state determiner, operably coupled to the transit node means, for determining a fast packet adaption, i.e., FPA, frame tag state;

a correlated congestion level determiner, operably coupled to the connection congestion level state determiner and to the fast packet adaption frame tag state determiner, for utilizing the congestion level state and the fast packet adaption frame tag state to determine a correlated congestion level that provides a backward correlated congestion level state to a backward correlated congestion level signal unit that is operably coupled to provide a backward correlated congestion level state indication to the source edge node means and that further provides a forward correlated congestion level to a forward correlated congestion level state determiner, wherein the forward correlated congestion level state determiner is further operably coupled to provide a frame relay forward explicit congestion notification to a frame relay forward explicit congestion notification marking unit that outputs frames of transmitted fast packets.

12. A system for providing rate-based congestion control of fast packet traffic having a plurality of fast packets in an integrated fast packet network, each packet being capable of conveying a plurality of levels of congestion indication, comprising at least:

source edge node means, operably coupled to receive the fast packet traffic for transmission over the network, said source edge node means having a negotiated throughput rate, i.e., R, and bucket size, i.e.. B, for rate-based monitoring and rate enforcement of the fast packet traffic utilizing a leaky bucket monitor/enforcer means for at least determining and marking a fast packet discard priority such that, when a frame is received in excess of said rate R and bucket size B, the discard priority of a first fast packet comprising said frame is set to 'last discarded' and the discard priority of subsequent fast packets is set to 'first discarded', except that if the backwards correlated congestion level state detection unit indicates that congestion along the path exceeds a predetermined level, the frame is discarded and a control fast packet is sent, or if the negotiated excess rate, i.e., R2, and excess bucket size, i.e., B2, is exceeded, the frame is discarded, transit node means, operably coupled to the source edge node means, having a plurality of intermediate nodes for providing at said intermediate nodes fast packet transmission paths utilizing congestion-reducing means for determining a transit node queue group, i.e.,TNQG, congestion level for fast packets and for discarding fast packets based on said transit node queue group congestion level and on a discard priority, and destination edge node means, operably coupled to the transit node means, for providing at least a correlated congestion level and for outputting reassembled frames of transmitted fast packets at a realized throughput rate, such that the realized throughput rate of transmitted fast packets exceeds a predetermined throughput rate where fast packets utilize unused or unallocated network capacity, wherein the destination edge node means further includes a backwards correlated congestion level state determiner, i.e., BCCL STATE DET, operably coupled to provide a backwards correlated congestion level, i.e., BCCL, state to the leaky bucket monitor/enforcer means via a control fast packet.

13. The system of claim 12, further including a low pass filter, operably coupled to the congestion-reducing means, for averaging a sampled queue depth that is input from a queue depth sampler.

14. A system for providing rate-based congestion control of fast packet traffic having a plurality of fast packets in an integrated fast packet network, each packet being capable of conveying a plurality of levels of congestion indication, comprising at least:

source edge node means, operably coupled to receive the fast packet traffic for transmission over the network, said source edge node means having a negotiated throughput rate, i.e., R, and bucket size, i.e., B, for rate-based monitoring and rate enforcement of the fast packet traffic utilizing a leaky bucket monitor/enforcer means for at least determining and marking a fast packet discard priority such that, when a frame is received in excess of said rate R and bucket size B, the discard priority of the first fast packet comprising said frame is set to 'last discarded' and the discard priority of subsequent fast packets is set to 'first discarded', except that if the backwards correlated congestion level, i.e., BCCL, state detection unit indicates that congestion along the path exceeds a predetermined level, the frame is discarded and a control fast packet is sent, or if the negotiated excess rate, i.e., R2, and excess bucket size, i.e., B2, is exceeded, the frame is discarded, transit node means, operably coupled to the source edge node means, having a plurality of intermediate nodes for providing at said intermediate nodes fast packet transmission paths utilizing congestion-reducing means for determining a transit node queue group congestion level, i.e., TNOG, for fast packets and for discarding fast packets based on said transit node queue group congestion level and on a discard priority, and destination edge node means, operably coupled to the transit node means, for providing at least a correlated congestion level and for outputting by said destination edge node means, reassembled frames of transmitted fast packets at a realized throughput rate, such that the realized throughput rate of transmitted fast packets exceeds a predetermined throughput rate where fast packets utilize unused or unallocated network capacity, further including a backwards correlated congestion level state determiner, i.e., BCCL STATE DET, operably coupled to the destination edge node means, for providing a backwards correlated congestion level state to the leaky bucket monitor/enforcer means via a control fast packet and further including a frame relay backwards explicit congestion notification, i.e., BECN, marking unit, operably coupled to the backwards correlated congestion level state determiner, i.e., BCCL STATE DET, for setting a backwards explicit congestion notification, BECN, bit when the backward correlated congestion level is equal to or greater than a predetermined congestion level.

15. A system for providing rate-based congestion control of fast packet traffic having a plurality of fast packets in an integrated fast packet network, each packet being capable of conveying a plurality of levels of congestion indication, comprising at least:

source edge node means, operably coupled to receive the fast packet traffic for transmission over the network, said source edge node means having a negotiated throughput rate, i.e., R, and bucket size, i.e., B, for rate-based monitoring and rate enforcement of the fast packet traffic utilizing a leaky bucket monitor/enforcer means for at least determining and marking a fast packet discard priority such that, when a frame is received in excess of said rate R and bucket size B, the discard priority of the first fast packet comprising said frame is set to 'last discarded' and the discard priority of subsequent fast packets is set to 'first discarded', except that if the backwards correlated congestion level, i.e., BCCL, state detection unit indicates that congestion along the path exceeds a predetermined level, the frame is discarded and a control fast packet is sent, or if the negotiated excess rate, i.e., R2, and excess bucket size, i.e., B2, is exceeded, the frame is discarded, transit node means, operably coupled to the source edge node means, having a plurality of intermediate nodes for providing at said intermediate nodes fast packet transmission paths utilizing congestion-reducing means for determining a transit node queue group, i.e., TNQG, congestion level for fast packets and for discarding fast packets based on said transit node queue group, TNQG, congestion level and on a discard priority, and destination edge node means, operably coupled to the transit node means, for providing at least a correlated congestion level and for outputting by said destination edge means, reassembled frames of transmitted fast packets at a realized throughput rate, such that the realized throughput rate of transmitted fast packets exceeds a predetermined throughput rate where fast packets utilize unused or unallocated network capacity, wherein the destination edge node means comprises at least:

a connection congestion level, i.e., CL, state determiner, operably coupled to the transit node means, for determining a connection congestion level state;

a fast packet adaption, i.e., FPA, frame tag state determiner, operably coupled to the source edge node means, for determining a fast packet adaption frame tag state;

a correlated congestion level, i.e., CL, determiner, operably coupled to the connection congestion level state determiner and to the fast packet adaption frame tag state determiner, for utilizing the congestion level state and the fast packet adaption frame tag state to determine a correlated congestion level that provides a backward correlated congestion level, i.e., BCCL, state to a backward correlated congestion level, i.e., BCCL, signal unit that is operably coupled to provide a backward correlated congestion level state indication to the source edge node means and that further provides a forward correlated congestion level, i.e., FCCL, to a forward correlated congestion level state determiner.

16. A system for providing rate-based congestion control of fast packet traffic having a plurality of fast packets in an integrated fast packet network, each packet being capable of conveying a plurality of levels of congestion indication, comprising at least:

source edge node means, operably coupled to receive the fast packet traffic for transmission over the network, said source edge node means having a negotiated throughput rate, i.e., R, and bucket size, i.e., B, for rate-based monitoring and rate enforcement of the fast packet traffic utilizing a leaky bucket monitor/enforcer means for at least determining and marking a fast packet discard priority such that, when a frame is received in excess of said rate R and bucket size B, the discard priority of the first fast packet comprising said frame is set to 'last discarded' and the discard priority of subsequent fast packets is set to 'first discarded', except that if the backwards correlated congestion level, i.e.. BCCL state detection unit indicates that congestion along the path exceeds a predetermined level, the frame is discarded and a control fast packet is sent, or if the negotiated excess rate R2 and excess bucket size B2 is exceeded, the frame is discarded, transit node means, operably coupled to the source edge node means, having a plurality of intermediate nodes for providing at said intermediate nodes fast packet transmission paths utilizing congestion-reducing means for determining a transit node queue group congestion level for fast packets and for discarding fast packets based on said transit node queue group congestion level and on a discard priority, and destination edge node means, operably coupled to the transit node means, for providing at least a correlated congestion level and for outputting, by said destination edge node means, reassembled frames of transmitted fast packets at a realized throughput rate, such that the realized throughput rate of transmitted fast packets exceeds a predetermined throughput rate where fast packets utilize unused or unallocated network capacity, wherein the destination edge node means comprises at least:

a connection congestion level state determiner, operably coupled to the transit node means, for determining a connection congestion level state;

a fast packet adaption frame tag state determiner, operably coupled to the source edge node means, for determining a fast packet adaption frame tag state;

a correlated congestion level determiner, operably coupled to the connection congestion level state determiner and to the fast packet adaption frame tag state determiner, for utilizing the congestion level CL state and the fast packet adaption frame tag state to determine a correlated congestion level that provides a backward correlated congestion levelstate to a backward correlated congestion level signal unit that is operably coupled to provide a backward correlated congestion level, i.e., BCCL, state indication to the source edge node means and that further provides a forward correlated congestion level to a forward correlated congestion level state determiner, wherein the forward correlated congestion level, i.e., FCCL, state determiner is further operably coupled to provide a frame relay forward explicit congestion notification, i.e., FECN, to a frame relay forward explicit congestion notification marking unit that outputs the reassembled frames of transmitted fast packets.

17. A method for providing rate-based congestion control of fast packet traffic having a plurality of fast packets in an integrated fast packet network, each packet being capable of conveying a plurality of levels of congestion indication, comprising at least the steps of:

rate-based monitoring and rate enforcing the fast packet traffic utilizing a leaky bucket monitor/enforcer, providing, at a plurality of intermediate nodes, fast packet transmission paths, and providing at least a correlated congestion level and for outputting, by a destination edge node unit, reassembled frames of transmitted fast packets at a realized throughput rate, such that where fast packets utilize unused or unallocated network capacity the realized throughput rate of transmitted fast packets exceeds a predetermined throughput rate, wherein utilizing the leaky bucket monitor/enforcer that provides a fast packet discard priority comprises at lest the steps of utilizing a leaky bucket monitor/enforcer for at least determining and marking a fast packet discard priority such that when a frame is received in excess of the negotiated rate R, the discard priority of the first fast packet comprising said frame is set to Last discard and the discard priority of subsequent fast packets is set to First discard, wherein the leaky bucket and discard priority marking, upon receiving a fast packet, utilize one of the following sets of steps:

(A) determining whether the fast packet is a first packet in a frame; where affirmative, updating the leaky bucket queue length Q and setting a first clock; determining whether the discard eligibility (DE) bit is set in the frame relay frame; where DE is unset, determining whether $Q<B$; where affirmative, updating leaky bucket 2 with queue length Q2 and setting a second clock; determining whether Q2 is greater than a second preselected maximum allocation (bucket size) B2; where $Q2 \leq B2$, unsetting an excess indication; determining a number of bits (K) in the fast packet and updating Q2 such that $Q2=Q2+k$; setting frame mark indication; determining whether a severe congestion level (greater than or equal to a predetermined congestion level) is set; where severe congestion indication is unset, tagging (marking) an FPA frame state; setting a discard priority to Last Discarded; and transmitting the fast packet;

(B) where the fast packet is other than the first packet in the frame, determining whether excess indication is set, and where excess indication is set, and discarding the fast packet;

(C) where excess indication is unset, determining whether a frame mark indication is set; where the frame mark indication is set, determining whether severe congestion indication is set; where the severe congestion indication is set, and discarding the fast packet;

(D) where the frame mark indication is unset, determining the number of bits (K) in the packet; updating Q such that $Q=Q+K$; setting a discard priority to Last Discarded; and transmitting the fast packet;

(E) where the severe congestion level indication is unset, determining the number of bits (K) in the packet; updating Q2 such that $Q2=Q2+K$; setting a discard priority to First Discarded; and transmitting the fast packet;

(F) where $Q \leq B$, unsetting the frame mark indication; determining the number of bits (K) in the packet; updating Q such that $Q=Q+K$; setting a discard priority to Last Discarded; and transmitting the fast packet;

(G) where the DE bit is set (typically to 1), bypassing the step of determining whether $Q>B$ in (25A) above, and otherwise proceeding as set forth in step (25A);

(H) where $Q2>B2$, setting an excess indication; and discarding the fast packet; and (I) where a severe congestion level indication is set, discarding the fast packet; creating an empty packet; tagging (marking) an FPA frame state; setting a discard priority to Last Discarded; and transmitting the fast packet.

18. The method of claim 15 wherein the congestion level field is two bits or an equivalent of two bits.

19. The method of claim 17, further including the step of providing a backwards correlated congestion level (BCCL) state to the leaky bucket monitor/enforcer.

20. The method of claim 19 further including the step of setting a backward explicit congestion notification (BECN) bit when the backward correlated congestion level is equal to or greater than a predetermined congestion level.

21. A method for providing rate-based congestion control of fast packet traffic having a plurality of fast packets in an integrated fast packet network, each packet being capable of conveying a plurality of levels of congestion indication, comprising at least the steps of:

rate-based monitoring and rate enforcing the fast packet traffic utilizing a monitor/enforcer, providing, at a plurality of intermediate nodes, fast packet transmission paths, and providing at least a correlated congestion level and for outputting, by a destination edge node unit, reassembled frames of transmitted fast packets at a realized throughput rate, such that the realized throughput rate of transmitted fast packets exceeds a predetermined throughput rate where fast packets utilize unused or unallocated network capacity, wherein the step of providing a plurality of intermediate nodes, fast packet transmission paths includes at least utilizing a congestion-reducing unit for determining a transit node queue group, i.e., TNQG, congestion level for fast packets and for discarding fast packets based on said TNQG congestion level and on a discard priority, wherein steps for determining a transit node queue group congestion level includes sampling a transit queue group for congestion levels such that one of the following sets of steps is executed in accordance with determinations as set forth below:

(A) sampling a queue length from a transit queue; updating an averaged queue length for the transit queue; determining whether an average queue length is greater than a first predetermined threshold1 {see step set (29B)}; where affirmative, determining whether the average queue length is greater than a second predetermined threshold2 {see step set (29C)}; where affirmative, determining whether the average queue length is greater than a third predetermined threshold3 {see step set (29D)}; where affirmative, setting the congestion level for the queue to severe; determining whether all queues in a selected group have been sampled {see step set (29E)}; and, where affirmative, determining whether the queue group congestion level, CL, is greater than a predetermined maximum congestion level in the queue group {see step set (29F)};

(B) in step (29A) where the average queue length is less than or equal to the threshold1, setting the CL to normal and proceeding to the step of determining whether all queues in the selected group have been sampled in step (29A);

(C) in step (29A) where the average queue length is less than or equal to the threshold2, setting the CL to mild and proceeding to the step of determining whether all queues in the selected group have been sampled in step (29A);

(D) in step (29A) where the average queue length is less than or equal to the threshold3, setting the CL to moderate and proceeding to the step of determining whether all queues in the selected group have been sampled in step (29A);

(E) in step (29A) where at least one queue in the selected group is unsampled, proceeding to the step of reading a queue length from a transit queue in step (29A); and (F) in step (29A), where the previous value of the queue group congestion level, CL, is less than the greatest congestion level of any queue in the queue group, or if the congestion levels of all queues in the queue group are 'normal', setting the queue group congestion level to the greatest congestion level of any queue in the queue group; otherwise, the queue group CL is unchanged.

22. A method for providing rate-based congestion control of fast packet traffic having a plurality of fast packets in an integrated fast packet network, each packet being capable of conveying a plurality of levels of congestion indication, comprising at least the steps of:

rate-based monitoring and rate enforcing the fast packet traffic utilizing a leaky bucket monitor/enforcer that monitors the fast packet traffic and determines and marks a fast packet discard priority for each fast packet, providing, at a plurality of intermediate nodes, fast packet transmission paths, and providing at least a correlated congestion level and for outputting, by a destination edge node unit, reassembled frames of transmitted fast packets at a realized throughput rate, such that the realized throughput rate of transmitted fast packets exceeds a predetermined throughput rate where fast packets utilize unused or unallocated network capacity, wherein the step of providing at least a correlated congestion level and for outputting reassembled frames of transmitted fast packets at a realized throughput rate comprises at least the steps of:

determining a connection congestion level, CL, state;

determining a fast packet adaption, FPA, frame tag state;

utilizing the CL state and the FPA frame tag state to determine a correlated congestion level, providing a backward correlated congestion level, BCCL, state to a BCCL signal unit, and providing a forward correlated congestion level, FCCL, to a FCCL state determiner.

23. The method of claim 22 further including the step of providing a frame relay forward explicit congestion notification (FECN) to a frame relay FECN marking unit that outputs the reassembled frames of transmitted fast packets.

24. A method for providing rate-based congestion control of fast packet traffic having plurality of fast packets in an integrated fast packet network, each packet being capable of conveying a plurality of levels of congestion indication, comprising at least the steps of:

rate-based monitoring and rate enforcing the fast packet traffic utilizing a leaky bucket monitor/enforcer, providing, at a plurality of intermediate nodes, fast packet transmission paths, and providing at least a correlated congestion level and for outputting, by a destination edge node unit, reassembled frames of transmitted fast packets at a realized throughput rate, such that the realized throughput rate of transmitted fast packets exceeds a predetermined throughput rate where fast packets utilize unused or unallocated network capacity, further including packet discarding and congestion level marking for data packets such that, for each data packet to be transmitted, one of the following sets of steps is followed at an intermediate node in accordance with determinations as set forth below:

(A) selecting a packet from a queue of data packets to be transmitted; determining whether an instantaneous queue length is less than a predetermined high discard level {see step set (32B)}; where affirmative, determining whether the queue group congestion level, CL, is severe, or alternatively, whether the instantaneous queue length is greater than a predetermined low discard level {see step set (32C)}; where affirmative, determining whether the discard priority is Last Discarded {see step set (32D)}; where affirmative, determining whether the packet CL is less than the queue group CL {see step set (32E)}; where affirmative, setting the packet CL equal to the queue group CL; and transmitting the packet;

(B) in step (32A) where the instantaneous queue length is greater than or equal to the predetermined high discard level, discarding the packet; and proceeding to select another packet from a queue of data packets to be transmitted in step (32A);

(C) in step (32A) where the queue group congestion level, CL, is other than severe and the instantaneous queue length is less than or equal to a predetermined low discard level, proceeding to determining whether the packet CL is less than the queue group CL in step (32A);

(D) in step (32A) where the discard priority is other than the Last Discarded, discarding the packet; and proceeding to select another packet from a queue of data packets to be transmitted in step (32A); and (E) in step (32A) where the packet CL is greater than or equal to the queue group CL, transmitting the packet, 25. A method for providing rate-based congestion control of fast packet traffic having a plurality of fast packets in an integrated fast packet network, each packet being capable of conveying a plurality of levels of congestion indication, comprising at least the steps of:

rate-based monitoring and rate enforcing the fast packet traffic utilizing a leaky bucket monitor/enforcer that monitors the fast packet traffic and determines and marks a fast packet discard priority for each fast packet, providing, at a plurality of intermediate nodes, fast packet transmission paths, and providing at least a correlated congestion level and for outputting, by a destination edge node unit, reassembled frames of transmitted fast packets at a realized throughput rate, such that where fast packets utilize unused or unallocated network capacity the realized throughput rate of transmitted fast packets exceeds a predetermined throughput rate, further including packet discarding and congestion level marking at a voice transmit queue such that, for each voice packet to be transmitted, one of the following sets of steps is followed in accordance with determinations as set forth below:

(A) selecting a packet from a queue of voice packets to be transmitted; setting variable PDP, packet discard priority, equal to a packet discard priority and variable IQL to an instantaneous queue length; determining whether IQL is greater than a predetermined voice watermark3 {see step set (33B)}; where the IQL is less than or equal to the predetermined voice watermark3, determining whether IQL is greater than a predetermined voice watermark2 and PDP is unequal to Last Discard {see step set (33C)}; where IQL is less than or equal to the predetermined voice watermark2 or PDP is equal to Last Discarded, determining whether IQL is greater than a predetermined voice watermark1 and PDP equals a first discard setting {see step set (33D)}; where IQL is less than or equal to the predetermined voice watermark1 or PDP is unequal to First Discarded, determining whether the packet CL is less than the queue group CL {see step set (33E)}; where affirmative, setting the packet CL equal to the queue group CL; and transmitting the packet;

(B) in step (33A) where the IQL is greater than the predetermined voice watermark3, discarding the packet; and proceeding to selecting a packet from a queue of voice packets to be transmitted in step (33A);

(C) in step (33A) where the IQL is greater than the predetermined voice watermark2 and PDP is unequal to Last Discard, discarding the packet; and proceeding to selecting a packet from a queue of voice packets to be transmitted in step (33A);

(D) in step (33A) where the IQL is greater than the predetermined voice watermark1 and PDP equals to the first discard, discarding the packet; and proceeding to selecting a packet from a queue of voice packets to be transmitted in step (33A);

(E) in step (33A) where the packet CL is greater than or equal to the queue group CL, transmitting the packet.

26. A method for providing rate-based congestion control of fast packet traffic having a plurality of fast packets in an integrated fast packet network, each packet being capable of conveying a plurality of levels of congestion indication, comprising at least the steps of:

rate-based monitoring and rate enforcing the fast packet traffic utilizing a leaky bucket monitor/enforcer that monitors the fast packet traffic and determines and marks a fast packet discard priority for each fast packet, providing, at a plurality of intermediate nodes, fast packet transmission paths, and providing at least a correlated congestion level and for outputting, by a destination edge node unit, reassembled frames of transmitted fast packets at a realized throughput rate, such where fast packets utilize unused or unallocated network capacity the realized throughput rate of transmitted fast packets exceeds a predetermined throughput rate, wherein the step of providing at least a correlated congestion level and outputting reassembled frames of transmitted fast packets further includes steps for updating congestion and tagging status, forward explicit congestion notification, FECN, marking and creation of backward control packet at a destination edge node such that, for each received outbound packet, one of the following sets of steps is followed in accordance with determinations as set forth below:

(A) updating the congestion status of the received outbound packet; determining whether the packet is a first packet in the frame {see step set (34B)}; where affirmative, updating a fast packet adaption tagging status, state; determining whether the forward path is congested and tagged, or alternatively, severely congested {see step set (34C)}; where the forward path is other than congested or the packet is untagged, and the forward path is other than severely congested, determining whether the tagging or congestion status has changed {see step set (34D)}; where the tagging or congestion status has changed, creating and storing a backward congestion code; storing a current tag and congestion status; setting a counter1 to a predetermined number N1; creating a control packet for a backward direction; and setting a control field for a backward congestion code and setting the control packet discard priority to Last Discard;

(B) in step (34A) where the outbound packet is other than a first packet in the frame, proceeding to the step of determining whether the tagging or congestion status has changed in step (34A);

(C) in step (34A) where the forward path is congested and the packet is tagged, or alternatively, the forward path is severely congested, setting a FECN bit in the frame relay frame;

(D) in step (34C) where tagging and congestion status are unchanged, determining whether the packet is the first packet in the frame {see step set (34E)}; where the packet is the first packet in the frame, determining whether a counter1 is set to zero; where the counter1 is set to zero, proceeding to the step of setting counter1 to the predetermined number N1 of step (34A);

(E) in step (34D) where the packet is other than the first packet in the frame, ending the status determining steps; and (F) in step (34D) where the counter1 is set to other than zero, setting the counter1 to counter1−1.

27. A method for providing rate-based congestion control of fast packet traffic having a plurality of fast packets in an integrated fast packet network, each packet being capable of conveying a plurality of levels of congestion indication, comprising at least the steps of:

rate-based monitoring and rate enforcing the fast packet traffic utilizing a leaky bucket monitor/enforcer that monitors the fast packet traffic and determines and marks a fast packet discard priority for each fast packet, providing, at a plurality of intermediate nodes, fast packet transmission paths, and providing at least a correlated congestion level and for outputting, by a destination edge node unit, reassembled frames of transmitted fast packets at a realized throughput rate, such that where fast packets utilize unused or unallocated network capacity the realized throughput rate of transmitted fast packets exceeds a predetermined throughput rate, wherein the step of providing at least a correlated congestion level and outputting reassembled frames of transmitted fast packets further includes steps for updating a tag status when receiving a first packet in a frame at a destination edge node such that, for each first packet in a frame received, one of the following sets of steps is followed in accordance with determinations as set forth below:

(A) determining whether the fast packet adaption, FPA, state is marked, i.e., tagged, {see step set (35B)}; where the FPA is untagged, determining whether a counter2 is set to zero {see step set(35C)}; where affirmative, setting a current tag status equal to untagged;

(B) where the FPA is tagged, setting the counter2 equal to a predetermined second number N2; and (C) where the counter2 is greater than zero, decrementing counter2, setting the current tag status equal to tagged.

28. A method for providing rate-based congestion control of fast packet traffic having a plurality of fast packets in an integrated fast packet network, each packet being capable of conveying a plurality of levels of congestion indication, comprising at least the steps of:

rate-based monitoring and rate enforcing the fast packet traffic utilizing a leaky bucket monitor/enforcer that monitors the fast packet traffic and determines and marks a fast packet discard priority for each fast packet, providing, at a plurality of intermediate nodes, fast packet transmission paths, and providing at least a correlated congestion level and for outputting, by a destination edge node unit, reassembled frames of transmitted fast packets at a realized throughput rate, such that where fast packets utilize unused or unallocated network capacity the realized throughput rate of transmitted fast packets exceeds a predetermined throughput rate, where the step of providing at least a correlated congestion level and outputting reassembled frames of transmitted fast packets further includes steps for creating and storing a backward congestion code at a destination edge node such that, for each packet having a tag or congestion status changed, one of the following sets of steps is followed in accordance with determinations as set forth below:

(A) determining whether a congestion level, CL, is one of: normal and mild {see step set (36B)}, where CL is other than one of normal and mild, determining whether CL is moderate {see step set (36C)}; where CL is other than one of normal, mild, and moderate, determining whether the tag status, i.e., state, is tagged {see step set (36D)}; where the tag status is tagged, setting a backward congestion code equal to severe; storing the backward congestion code;

(B) in step (36A) where the congestion level is equal to one of normal and mild, setting the backward congestion code equal to normal and storing the backward congestion code;

(C) in step (36A) where the congestion level is equal to moderate, determining whether the tag status is tagged {see step set (36E)}; where the tag status is tagged, setting the backward congestion code equal to moderate; and storing the backward congestion code;

(D) in step (36A) where the tagged status is untagged, setting the backward congestion code equal to moderate; and storing the backward congestion code;

(E) in step (36C) where the tag status is untagged, setting the backward congestion code equal to normal; and storing the backward congestion code.

29. A method for providing rate-based congestion control of fast packet traffic having a plurality of fast packets in an integrated fast packet network, each packet being capable of conveying a plurality of levels of congestion indication, comprising at least the steps of:

rate-based monitoring and rate enforcing the fast packet traffic utilizing a leaky bucket monitor/enforcer that monitors the fast packet traffic and determines and marks a fast packet discard priority for each fast packet, providing, at a plurality of intermediate nodes, fast packet transmission paths, and providing at least a correlated congestion level and for outputting, by a destination edge node unit, reassembled frames of transmitted fast packets at a realized throughput rate, such that where fast packets utilize unused or unallocated network capacity the realized throughput rate of transmitted fast packets exceeds a predetermined throughput rate, wherein the rate monitoring/enforcing of traffic utilizing a monitor/enforcer further includes steps for receiving a control packet in a backward direction at a source edge node such that for each control packet received, one of the following sets of steps is followed in accordance with determinations as set forth below:

(A) sampling a control field of the received control packet; determining whether the control field has changed from a previous backward congestion indication {see step set (37B)}; where affirmative, determining whether the control field is a normal value {see step set (37C)}; where the control field is other than normal, determining whether the control field is a moderate value {see step set (37D)}; where the control field is moderate, setting the control field to a moderate indication;

(B) in step (37A) where the backward congestion indication, i.e., value, is unchanged, ceasing taking further steps to set the control field;

(C) in step (37A) where the control field is a normal value, setting the backward congestion indication to a normal indication; and (D) in step (37A) where the control field is other than a normal value and other than a moderate value, setting the control field to a severe indication.

30. A method for providing rate-based congestion control of fast packet traffic having a plurality of fast packets in an integrated fast packet network, each packet being capable of conveying a plurality of levels of congestion indication, comprising at least the steps of:

rate-based monitoring and rate enforcing the fast packet traffic utilizing a leaky bucket monitor/enforcer that monitors the fast packet traffic and determines and marks a fast packet discard priority for each fast packet, providing, at a plurality of intermediate nodes, fast packet transmission paths, and providing at least a correlated congestion level and for outputting, by a destination edge node unit, reassembled frames of transmitted fast packets at a realized throughput rate, such that where fast packets utilize unused or unallocated network capacity the realized throughput rate of transmitted fast packets exceeds a predetermined throughput rate, wherein the rate monitoring/enforcing of traffic utilizing a monitor/enforcer further includes steps for receiving a data fast packet in a backward direction and setting a backward explicit congestion notification, i.e., BECN, at a source edge node such that, for each control packet received in a backward direction, one of the following sets of steps is followed in accordance with determinations as set forth below:

(A) determining whether the packet is a first fast packet in its frame {see step set (38B)}: where the fast packet is a first fast packet in its frame, determining whether a backward congestion indication is equal to normal {see step set (38C)}; where backward congestion indication is equal to normal, ceasing taking steps to set BECN;

(B) in step (38A) where the fast packet is other than a first fast packet in its frame, ceasing taking further steps to set the BECN; and (C) in step (38A) where the backward congestion indication is indicated as other than normal, setting the frame relay BECN to a set state.

* * * * *